•

US008242218B2

(12) United States Patent
Lorenz et al.

(10) Patent No.: US 8,242,218 B2
(45) Date of Patent: *Aug. 14, 2012

(54) COPOLYMER SYNTHESIS PROCESS

(75) Inventors: Klaus K. Lorenz, Zangberg (DE);
Alexander Kraus, Evenhausen (DE);
Barbara Wimmer, Tacherting (DE);
Petra Wagner, Trostberg (DE);
Christian Scholz, Wald an der Alz (DE);
Manfred Bichler, Engelsberg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/114,356

(22) Filed: May 24, 2011

(65) Prior Publication Data

US 2011/0313112 A1    Dec. 22, 2011

Related U.S. Application Data

(63) Continuation of application No. 12/477,565, filed on Jun. 3, 2009, now Pat. No. 7,973,110.

(60) Provisional application No. 61/061,821, filed on Jun. 16, 2008.

(51) Int. Cl.
*C08F 2/16* (2006.01)
*C08F 2/10* (2006.01)
*C08F 216/14* (2006.01)

(52) U.S. Cl. ............... 526/80; 526/87; 526/915; 524/5; 524/832

(58) Field of Classification Search .............. 526/80, 526/87, 915; 524/5, 832
See application file for complete search history.

(56) References Cited

U.S. PATENT DOCUMENTS

| 5,081,111 | A | 1/1992 | Akimoto et al. |
| 5,162,402 | A | 11/1992 | Ogawa et al. |
| 5,320,837 | A | 6/1994 | Akimoto et al. |
| 5,358,566 | A | 10/1994 | Tanaka et al. |
| 5,362,323 | A | 11/1994 | Koyata et al. |
| 5,362,324 | A | 11/1994 | Cerulli et al. |
| 5,369,198 | A | 11/1994 | Albrecht et al. |
| 5,634,966 | A | 6/1997 | Berke et al. |
| 5,661,206 | A | 8/1997 | Tanaka et al. |
| 5,665,158 | A | 9/1997 | Darwin et al. |
| 5,703,174 | A | 12/1997 | Arfaei et al. |
| 5,725,657 | A | 3/1998 | Darwin et al. |
| 5,798,425 | A | 8/1998 | Albrecht et al. |
| 5,840,114 | A | 11/1998 | Jeknavorian et al. |
| 5,912,284 | A | 6/1999 | Hirata et al. |
| 5,925,184 | A | 7/1999 | Hirata et al. |
| 6,166,112 | A | 12/2000 | Hirata et al. |
| 6,187,841 | B1 | 2/2001 | Tanaka et al. |
| 6,211,317 | B1 | 4/2001 | Albrecht et al. |
| 6,214,958 | B1 | 4/2001 | Le-Khac et al. |
| 6,294,015 | B1 | 9/2001 | Yamashita et al. |
| 6,376,581 | B1 | 4/2002 | Tanaka et al. |
| 6,387,173 | B2 | 5/2002 | Greenwood et al. |
| 6,387,176 | B1 | 5/2002 | Widmer et al. |
| 6,391,923 | B1 | 5/2002 | Pöllmann et al. |
| 6,437,027 | B1 | 8/2002 | Isomura et al. |
| 6,486,260 | B1 | 11/2002 | Yuasa et al. |
| 6,653,441 | B2 | 11/2003 | Harre et al. |
| 6,680,348 | B1 | 1/2004 | Amaya et al. |
| 6,712,900 | B2 | 3/2004 | Wombacher et al. |
| 6,727,315 | B2 | 4/2004 | Yamamoto et al. |
| 6,762,220 | B1 | 7/2004 | Yaguchi et al. |
| 6,777,517 | B1 | 8/2004 | Albrecht et al. |
| 6,815,513 | B2 | 11/2004 | Le-Khac et al. |
| 6,855,752 | B2 | 2/2005 | Velten et al. |
| 6,864,337 | B2 | 3/2005 | Yuasa et al. |
| 6,911,494 | B2 | 6/2005 | Yamashita et al. |
| 7,026,402 | B2 | 4/2006 | Schober et al. |
| 7,125,944 | B2 | 10/2006 | Yamashita et al. |
| 7,375,163 | B2 | 5/2008 | Schober et al. |
| 7,405,264 | B2 | 7/2008 | Yuasa et al. |
| 7,425,596 | B2 | 9/2008 | Kraus et al. |
| 7,482,405 | B2 | 1/2009 | Matsumoto et al. |
| 7,973,110 | B2 * | 7/2011 | Lorenz et al. .................. 526/80 |

(Continued)

FOREIGN PATENT DOCUMENTS

| DE | 103 37 975 A1 | 4/2005 |
| EP | 0537870 A1 | 4/1993 |
| EP | 1016638 A2 | 7/2000 |
| EP | 1061089 B1 | 3/2004 |
| EP | 1218427 B1 | 10/2005 |
| EP | 1655272 A1 | 5/2006 |
| EP | 1656404 B | 8/2007 |
| EP | 2090553 A1 | 8/2009 |

(Continued)

OTHER PUBLICATIONS

PCT/EP2009/057180—Written Opinion of the International Searching Authority, Oct. 7, 2009.

(Continued)

*Primary Examiner* — Fred M Teskin
(74) *Attorney, Agent, or Firm* — Curatolo Sidoti Co., LPA; Joseph G. Curatolo; Salvatore A. Sidoti

(57) ABSTRACT

Preparing a non-ionic copolymer having a hydrolysable monomer residue and a polyether macromonomer residue in a semicontinuous mode in a polymerization reactor associated with a metering device, including introducing polyether macromonomer and water into the reactor, wherein hydrolysable monomer which is added thereto forms a polymerization reaction mixture; introducing hydrolysable monomer into the metering device; adding hydrolysable monomer into the reactor from the metering device; passing a free radical polymerization initiator into the reactor before and/or during the addition of the hydrolysable monomer, the hydrolysable monomer and the polyether macromonomer reacting by free radical polymerization to form the non-ionic copolymer; and, subjecting the reaction mixture to polymerization while an addition rate of the hydrolysable monomer and/or at least a component of the polymerization initiator is varied stepwise or continuously. No monomer is introduced to incorporate ionic cement binding sites into the non-ionic copolymer.

20 Claims, 10 Drawing Sheets

U.S. PATENT DOCUMENTS

| | | |
|---|---|---|
| 2002/0103290 A1 | 8/2002 | Pollmann et al. |
| 2003/0199616 A1 | 10/2003 | Yamashita et al. |
| 2003/0209695 A1 | 11/2003 | Tsuzuki et al. |
| 2004/0204517 A1 | 10/2004 | Yamashita et al. |
| 2006/0004148 A1 | 1/2006 | Sulser et al. |
| 2006/0100355 A1 | 5/2006 | Waser et al. |
| 2006/0111478 A1 | 5/2006 | Hommer et al. |
| 2006/0183820 A1 | 8/2006 | Asano et al. |
| 2006/0281885 A1 | 12/2006 | Bichler et al. |
| 2006/0281886 A1 | 12/2006 | Bichler et al. |
| 2007/0039515 A1 | 2/2007 | Bandoh et al. |
| 2007/0043190 A1 | 2/2007 | Kraus et al. |
| 2007/0073022 A1 | 3/2007 | Yuasa et al. |
| 2007/0161724 A1 | 7/2007 | Moraru et al. |
| 2007/0181039 A1 | 8/2007 | Yamamoto et al. |
| 2007/0255032 A1 | 11/2007 | Bichler et al. |
| 2008/0017078 A1 | 1/2008 | Bichler et al. |
| 2008/0295741 A1 | 12/2008 | Jeknavorian et al. |
| 2008/0300343 A1 | 12/2008 | Becker et al. |
| 2009/0163622 A1 | 6/2009 | Albrecht et al. |
| 2009/0312460 A1 | 12/2009 | Lorenz et al. |

FOREIGN PATENT DOCUMENTS

| | | |
|---|---|---|
| EP | 2090596 A1 | 8/2009 |
| EP | 2090597 A1 | 8/2009 |
| EP | 2090599 A1 | 8/2009 |
| EP | 2113519 A1 | 11/2009 |
| JP | 2002/179449 | 6/2002 |
| JP | 2005/330129 | 12/2005 |
| WO | WO 2006/133933 A2 | 12/2006 |

OTHER PUBLICATIONS

PCT/EP2009/057180—International Search Report, Oct. 7, 2009.

* cited by examiner

COPOLYMER SYNTHESIS PROCESS

CROSS-REFERENCE TO RELATED APPLICATIONS

The present application is a continuation of U.S. Ser. No. 12/477,565, filed Jun. 3, 2009, now U.S. Pat. No. 7,973,110, which claims the benefit of the filing date, under 35 U.S.C. §119(e), from U.S. Provisional Application Ser. No. 61/061,821, filed Jun. 16, 2008, which applications are incorporated herein by reference.

Conventional dispersants for cementitious compositions typically achieve good water reduction, however, they are limited in their ability to retain workability over a long period of time. An alternate method for extended workability retention is the use of retarding admixtures. In this scenario, the benefit of workability retention is often achieved at the expense of setting times and early strength. The usefulness of these dispersants is therefore limited by their inherent limitations in molecular architecture.

Conventional dispersants are static in their chemical structure over time in cementitious systems. Their performance is controlled by monomer molar ratio that is fixed within a polymer molecule. A water reducing effect or dispersing effect is observed upon dispersant adsorption onto the cement surface. As dispersant demand increases over time due to abrasion and hydration product formation, which creates more surface area, these conventional dispersants are unable to respond and workability is lost.

Typically, the issue of extended workability is solved by either re-tempering (adding more water) to the concrete at the point of placement to restore workability, or by adding more high range water reducer. Addition of water leads to lower strength concrete and thus creates a need for mixes that are "over-designed" in the way of cement content. Site addition of high range water reducer requires truck mounted dispensers which are costly, difficult to maintain, and difficult to control.

The subject non-ionic copolymers are initially non-dispersing molecules, having low or no affinity to cement particles, and therefore do not contribute to achieving the cementitious composition's initial workability targets. The subject copolymers remain in solution, however, acting as a reservoir of potential dispersant polymer for future use. Over time, as dispersant demand increases, due either in part to the exhaustion of conventional dispersant as discussed above, or partly or wholly to mix design factors, these molecules undergo base-promoted hydrolysis reactions along the polymer backbone which generate active binding sites both to initialize and to increase the polymer's binding affinity, resulting in the in-situ generation of "active" dispersant polymer over time, to extend slump and workability of the composition.

The use of the subject non-ionic copolymers as a potential dispersant reservoir in cementitious compositions provides extended workability retention beyond what has previously been achievable with static polymers. Use of the subject non-ionic copolymers alleviates the need to re-temper, and allow producers to reduce cement content (and thus cost) in their mix designs. Use of the subject non-ionic copolymers allows for better control over longer-term concrete workability, more uniformity and tighter quality control for concrete producers.

Provided is a process for extending workability to a cementitious mixture containing hydraulic cement and water, comprising introducing into the cementitious mixture an admixture comprising a substantially non-ionic copolymer. In one embodiment, the process introduces a non-ionic, polyether-polyester copolymer into the cementitious mixture. The subject process achieves slump retention and also the production of high early strength cementitious compositions.

Also provided are novel non-ionic copolymers comprising a hydrolysable moiety and at least one dispersing moiety, and a process for their synthesis.

DETAILED DESCRIPTION

Figure 1:
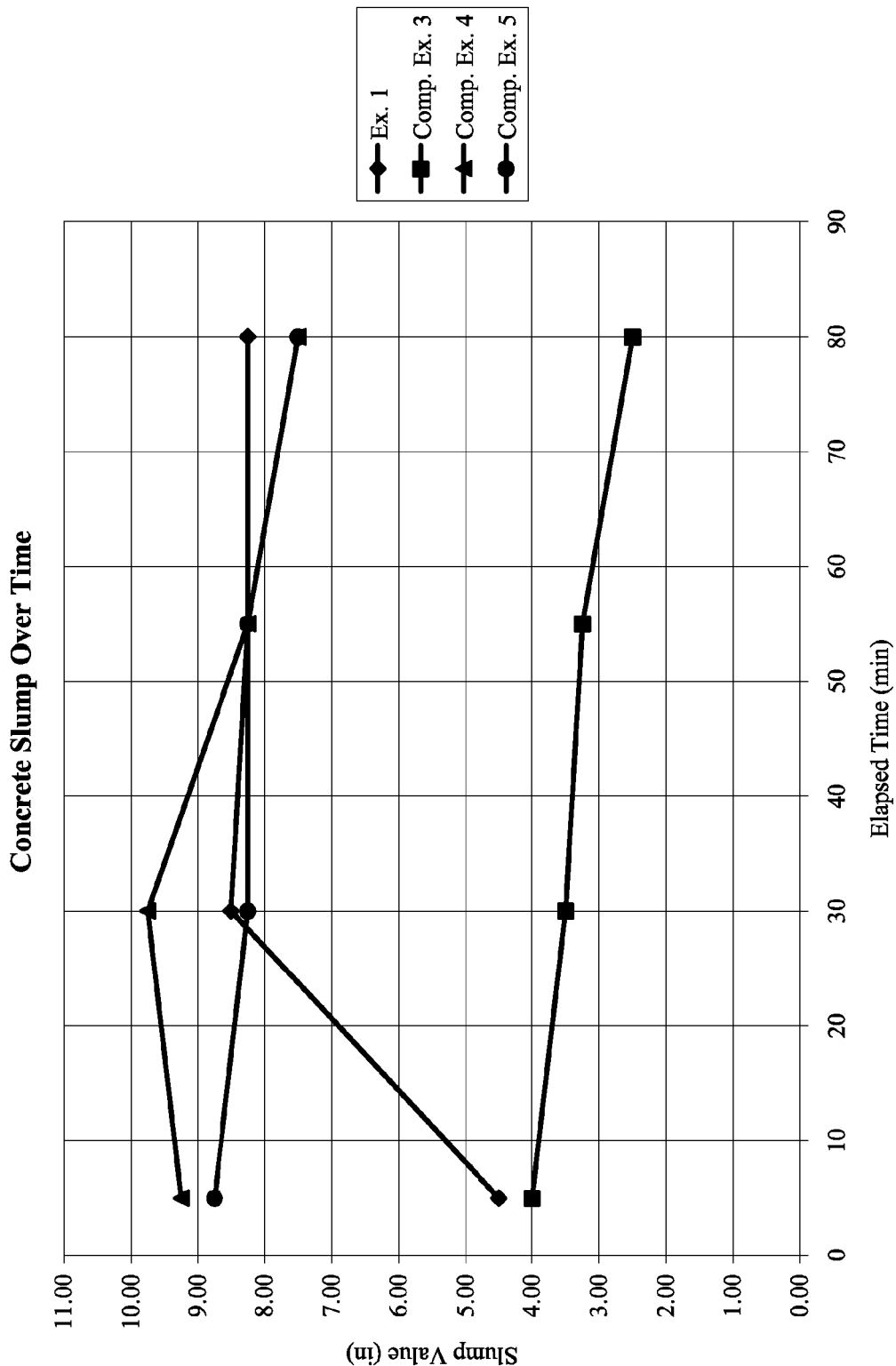
FIG. 1 is a graphical representation of concrete slump versus time achieved by the use of a subject copolymer as compared to conventional polycarboxylate dispersants and no slump-affecting admixture.

A process is provided for extending workability to a cementitious mixture containing hydraulic cement and water, comprising introducing into the cementitious mixture an admixture comprising a substantially non-ionic copolymer, wherein the copolymer comprises residues of at least the following monomers:

Component A comprising at least one ethylenically unsaturated carboxylic acid ester monomer comprising a moiety hydrolysable in the cementitious mixture, wherein the hydrolyzed monomer residue comprises an active binding site for a component of the cementitious mixture; and, at least one of:
Component B comprising at least one ethylenically unsaturated, carboxylic acid ester or alkenyl ether monomer comprising at least one $C_{2-4}$ oxyalkylene side group of about 1 to 30 units; or,
Component C comprising at least one ethylenically unsaturated, carboxylic acid ester or alkenyl ether monomer comprising at least one $C_{2-4}$ oxyalkylene side group of 31 to about 350 units;
wherein the molar ratio of Component A to the sum of the molar ratios of Component B and Component C is about 1:1 to about 10:1. In certain embodiments, both Component B and Component C are present in the subject copolymer.

A novel, substantially non-ionic polyether-polyester copolymer is provided for extending workability to a cementitious mixture containing hydraulic cement and water, wherein the copolymer comprises residues of at least the following monomers:

Component A comprising at least one ethylenically unsaturated carboxylic acid ester monomer comprising a moiety hydrolysable in the cementitious mixture, wherein the hydrolyzed monomer residue comprises an active binding site for a component of the cementitious mixture; and,
at least one of:
Component B comprising at least one ethylenically unsaturated, carboxylic acid ester or alkenyl ether monomer comprising at least one $C_{2-4}$ oxyalkylene side group of about 1 to 30 units; or,
Component C comprising at least one ethylenically unsaturated, carboxylic acid ester or alkenyl ether monomer comprising at least one $C_{2-4}$ oxyalkylene side group of 31 to about 350 units;
wherein the molar ratio of Component A to the sum of the molar ratios of Component B and Component C is about 1:1 to about 10:1. In certain embodiments, both Component B and Component C are present.

Also provided is a cementitious composition comprising hydraulic cement, water, and an admixture comprising the non-ionic polyether-polyester copolymer set forth above.

A process is provided for the preparation of a non-ionic copolymer comprising at least one hydrolysable monomer residue and at least one polyether macromonomer residue in a semicontinuous mode of operation in a polymerization apparatus containing a polymerization reactor associated with, or connected to, a metering device, the process comprising:

introducing at least a portion of the polyether macromonomer with low reactivity (relative to the hydrolysable monomer) and water into the polymerization reactor, wherein the hydrolysable monomer with higher reactivity which is added thereto forms an aqueous medium polymerization reaction mixture, optionally wherein the aqueous medium is present in the form of an aqueous solution;

introducing at least a portion of the hydrolysable monomer into the metering device;

adding at least a portion of the hydrolysable monomer into the polymerization reactor from the metering device;

passing a free radical polymerization initiator into the polymerization reactor before and/or during the addition of the hydrolysable monomer into the polymerization reactor, wherein the hydrolysable monomer and the polyether macromonomer are reacted in the aqueous medium polymerization reaction mixture by free radical polymerization with formation of the non-ionic copolymer; and, subjecting the reaction mixture to polymerization while an addition rate of the hydrolysable monomer and/or at least a component of the free radical polymerization initiator is varied stepwise or continuously;

wherein no monomer is introduced into the polymerization reactor to incorporate ionic cement binding sites into the non-ionic copolymer prior to mixing the copolymer in an alkaline aqueous environment (including but not limited to a cementitious composition).

In one embodiment, the subject copolymer admixture system may include varied portions of a water reducing polymer, used in combination with the subject copolymer in which the binding sites have been substantially protected to the extent that the copolymer has essentially no dispersing characteristics when it is initially dosed. For example, due to the absence of ionic binding moieties in the copolymer upon dosing, there is essentially no initial dispersing activity. After dosing, or introduction into the cementitious composition, the deactivated or protected binding site moieties in the subject copolymers are hydrolyzed, or activated, at an appropriate rate to counter the loss of dispersion that is expected when the water reducer is used alone. In other embodiments, the protected binding site moieties may be chosen based on their hydrolysis rate(s) in order to optimize workability over time as compared to conventional water reducers.

The use of the subject copolymer admixture system has distinct advantages over a single component system, in that the concrete producer has a virtually infinite opportunity to respond to the variety of conditions that may be experienced in the field. For example, the producer may not require significantly extended slump retention for short-haul projects, and therefore the cementitious mix design could include very little of the non-ionic copolymer, instead relying mainly on a conventional water reducer for workability performance. This may also be the case in cold weather conditions. However, in warmer conditions, or for longer haul projects, there would increasingly be the need for additional amounts of the hydrolysable non-ionic copolymer and potentially less of the conventional water reducer. The batch-to-batch variability in cementitious mix performance requirements, and hour to hour variance in temperature, can be accommodated by the copolymer admixture system for optimal efficiency at ready mix, and to a lesser extent, precast concrete producers.

The hydraulic cement can be a portland cement, a calcium aluminate cement, a magnesium phosphate cement, a magnesium potassium phosphate cement, a calcium sulfoaluminate cement, pozzolanic cement, slag cement, or any other suitable hydraulic binder. Aggregate may be included in the cementitious composition. The aggregate can be silica, quartz, sand, crushed marble, glass spheres, granite, limestone, calcite, feldspar, alluvial sands, any other durable aggregate, and mixtures thereof The non-ionic copolymers of the subject copolymer admixture system have all, or substantially all, of their potential cement binding sites blocked, or protected, with hydrolysable groups that are stable to storage and formulation conditions, but these latent binding sites are triggered to be unblocked or de-protected when the copolymer comes into contact with the highly alkaline chemical environment that is found in concrete cementitious mixtures. Therefore, the non-ionic copolymers have little or no affinity for cementitious particles upon introduction into the cementitious composition, but develop affinity over time as the hydrolysable groups do hydrolyze.

By way of illustration, but not for limitation, the hydrolysable moiety may comprise at least one of a $C_{1-20}$ alkyl ester, $C_{1-20}$ amino alkyl ester, $C_{2-20}$ alcohol, $C_{2-20}$ amino alcohol, or amide. Hydrolysable moieties may include, but are not limited to, acrylate or methacrylate esters of varied groups having rates of hydrolysis that make them suitable for the time scale of concrete mixing and placement, in certain embodiments up to about 2 to about 4 hours. For example, in one embodiment the ethylenically unsaturated monomer of Component A may include an acrylic acid ester with an ester functionality comprising the hydrolysable moiety. In certain embodiments, a hydroxyalkanol, such as a hydroxyethanol or hydroxypropylalcohol function comprises the latent binding sites as the hydrolysable moiety of a carboxylic acid ester residue. The ester functionality may therefore comprise at least one of hydroxypropyl or hydroxyethyl. In other embodiments, other types of latent binding sites with varying rates of saponification are provided, such as acrylamide or methacrylamide derivatives. In certain embodiments, the ethylenically unsaturated monomer of Component A may comprise an imide, optionally comprising maleimide.

Of course, the subject copolymer may comprise the residues of more than one Component A ethylenically unsaturated monomer comprising a hydrolysable moiety. For example, more than one Component A ethylenically unsaturated monomer comprising a hydrolysable moiety may include the residues of a) more than one type of ethylenically unsaturated monomer; b) more than one hydrolysable moiety; or c) a combination of more than one type of ethylenically unsaturated monomer and more than one hydrolysable moiety. By way of illustration, but not for limitation, the hydrolysable moiety may comprise at least one or more than one $C_{2-20}$ alcohol functionality.

Selection of either or both of the type of ethylenically unsaturated monomer residue unit incorporated into the copolymer chain, and the hydrolysable moiety derivative, or hydrolysable side group, linked to the residue, as well as the type of linkage, affects the rate of hydrolysis of the latent binding site in use, and thus the duration of workability of the cementitious composition comprising the non-ionic copolymer.

Side chain containing groups of Component B and Component C monomers may comprise $C_2$ to $C_4$ oxyalkylene chains of varying length, that is, varying number of oxyalkylene units such as either (poly)ethylene oxide, (poly)propylene oxide, or combinations thereof, and may include linkages such as esters or ethers. In certain embodiments, a portion of the side chains have a relatively shorter length (lower molecular weight) contributing to improved mass efficiency, and a portion of the side chains have a relatively longer length (higher molecular weight) contributing to a higher dispersing effect when the latent binding sites hydrolyze and become available for binding to the cementitious particles.

In certain embodiments, one or more of the Component B and/or one or more of the Component C monomers may be non-hydrolysable in cementitious compositions. In certain embodiments of the subject non-ionic copolymer, at least one of the Component B or Component C ethylenically unsaturated monomers may comprise a non-hydrolysable $C_{2-8}$ carboxylic acid ester. In certain other embodiments, the at least one of the Component B or Component C ethylenically unsaturated monomers may additionally or alternatively comprise a $C_{2-8}$ alkenyl group, optionally a non-hydrolysable $C_{2-8}$ alkenyl ether group.

In the latter embodiments, the non-hydrolysable ethylenically unsaturated monomer may comprise a vinyl, allyl or (meth)allyl ether, or may be derived from a $C_{2-8}$ unsaturated alcohol. By way of illustration but not limitation, the $C_{2-8}$ unsaturated alcohol may be at least one of vinyl alcohol, (meth)allyl alcohol, isoprenol, or another methyl-butenol.

In other embodiments, at least one of the Component B or Component C ethylenically unsaturated monomers may comprise a (meth)acrylic acid ester.

The oxyalkylene side group of the Component B and/or Component C ethylenically unsaturated monomers may comprises at least one of ethylene oxide, propylene oxide, polyethylene oxide, polypropylene oxide, or mixtures thereof. The oxyalkylene units may be present in the form of homopolymers, or random or block copolymers. Depending upon the monomers from which the copolymer is synthesized, at least one of the Component B or Component C ethylenically unsaturated monomer side groups may contain at least one $C_4$ oxyalkylene unit.

In certain embodiments, the non-ionic copolymer may comprise additional non-ionic, non-hydrolysable Component D monomer residues derived from other non-hydrolysable ethylenically unsaturated monomers, such as but not limited to styrene, ethylene, propylene, isobutene, alpha-methyl styrene, methyl vinyl ether, and the like.

In certain embodiments, the mole ratio of Component A to Components B and C, that is, (A):(B+C), is between about 1:1 to about 10:1, in certain embodiments about 1:1 to about 9:1. In certain embodiments, where both Component B and Component C are present in the copolymer, the mole ratio of (B):(C) is between about 0.7:0.3 to about 0.3:0.7. In other embodiments, the mole ratio of (B):(C) is between about 0.95:0.05 to about 0.05:0.95.

In certain embodiments, the non-ionic copolymer is represented by the following general formula (I):

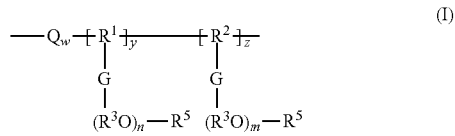

wherein Q is a Component A ethylenically unsaturated monomer comprising a hydrolysable moiety; G comprises O, C(O)—O, or O—$(CH_2)_p$—O where p=2 to 8, and wherein mixtures of G are possible in the same polymer molecule; $R^1$ and $R^2$ each independently comprise at least one $C_2$-$C_8$ alkyl; $R^3$ comprises $(CH_2)_c$ wherein each c is a numeral from 2 to about 5 and wherein mixtures of $R^3$ are possible in the same polymer molecule; each $R^5$ comprises at least one of H, a $C_{1-20}$ (linear or branched, saturated or unsaturated) aliphatic hydrocarbon radical, a $C_{5-8}$ cycloaliphatic hydrocarbon radical, or a substituted or unsubstituted $C_{6-14}$ aryl radical; m=1 to 30, n=31 to about 350, w=about 1 to about 10, y=0 to about 1, and z=0 to about 1; and wherein y+z is greater than 0 to about 1 and w is less than or equal to 10 times the sum of y+z. Examples of the ethylenically unsaturated monomer comprising a hydrolysable moiety are discussed above.

In particular embodiments, the non-ionic copolymer is represented by the following general formula (II):

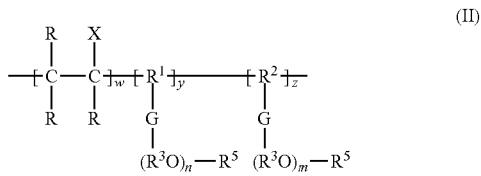

wherein G comprises O, C(O)—O, or O—(CH$_2$)$_p$—O where p=2 to 8, and wherein mixtures of G are possible in the same polymer molecule; R comprises at least one of H or CH$_3$; R$^1$ and R$^2$ each independently comprise at least one C$_2$-C$_8$ alkyl; R$^3$ comprises (CH$_2$)$_c$ wherein each c is a numeral from 2 to about 5 and wherein mixtures of R$^3$ are possible in the same polymer molecule; X comprises a hydrolysable moiety; each R$^5$ comprises at least one of H, a C$_{1-20}$ (linear or branched, saturated or unsaturated) aliphatic hydrocarbon radical, a C$_{5-8}$ cycloaliphatic hydrocarbon radical, or a substituted or unsubstituted C$_{6-14}$ aryl radical; m=1 to 30, n=31 to about 350, w=about 1 to about 10, y=0 to about 1, and z=0 to about 1; and wherein y+z is greater than 0 to about 1 and w is less than or equal to 10 times the sum of y+z. According to this formula, in certain embodiments, the hydrolysable moiety may comprise at least one of alkyl ester, amino alkyl ester, hydroxyalkyl ester, amino hydroxyalkyl ester, or amide such as acrylamide, methacrylamide, and their derivatives.

In specific embodiments, the non-ionic copolymer is represented by the following general formula (III):

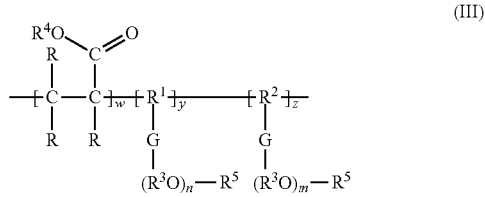

(III)

wherein G comprises O, C(O)—O, or O—(CH$_2$)$_p$—O where p=2 to 8, and wherein mixtures of G are possible in the same polymer molecule; R comprises at least one of H or CH$_3$; R$^1$ and R$^2$ each independently comprise at least one C$_2$-C$_8$ alkyl; R$^3$ comprises (CH$_2$)$_c$ wherein each c is a numeral from 2 to about 5 and wherein mixtures of R$^3$ are possible in the same polymer molecule; R$^4$ comprises at least one of C$_{1-20}$ alkyl or C$_{2-20}$ hydroxyalkyl; each R$^5$ comprises at least one of H, a C$_{1-20}$ (linear or branched, saturated or unsaturated) aliphatic hydrocarbon radical, a C$_{5-8}$ cycloaliphatic hydrocarbon radical, or a substituted or unsubstituted C$_{6-14}$ aryl radical; m=1 to 30, n=31 to about 350, w=about 1 to about 10, y=0 to about 1, and z=0 to about 1; and wherein y+z is greater than 0 to about 1 and w is less than or equal to 10 times the sum of y+z. According to this formula, in certain embodiments, a non-ionic copolymer may be used wherein each p is 4; each R$^4$ comprises C$_2$H$_4$OH or C$_3$H$_6$OH; each R$^5$ comprises H; m=about 5 to 30, n=31 to about 250, w=about 1 to about 9, y=0 to about 1, and z=0 to about 1; and wherein y+z is greater than 0 to about 1, and w is less than or equal to 9 times the sum of y+z.

With reference to formulas (I), (II) and (III), in certain embodiments the molar ratio of w to (y+z) may be about 1:1 to about 10:1. Also with reference to formulas (I), (II) and (III), in certain embodiments the molar ratio of w to (y+z) may be about 1:1 to about 9:1.

The subject non-ionic copolymers can be prepared by combining their respective substituted component monomers and initiating co-polymerization, or by the following polymerization techniques.

The non-ionic copolymer may be prepared by batch, semi-batch, semi-continuous or continuous procedures, including introduction of components during initiation of polymerization, by linear dosage techniques, or by ramp-wise dosage techniques with changes in dosage stepwise or continuously, both to higher and/or lower dosage rates in comparison to the previous rate.

A process is provided for the preparation of a non-ionic copolymer comprising at least one hydrolysable monomer residue and at least one polyether macromonomer residue in a semicontinuous mode of operation in a polymerization apparatus containing a polymerization reactor associated with, or connected to, a metering device, the process comprising:

introducing at least a portion of the polyether macromonomer with low reactivity (relative to the hydrolysable monomer) and water into the polymerization reactor, wherein the hydrolysable monomer with higher reactivity which is added thereto forms an aqueous medium polymerization reaction mixture, optionally wherein the aqueous medium is present in the form of an aqueous solution;

introducing at least a portion of the hydrolysable monomer into the metering device;

adding at least a portion of the hydrolysable monomer into the polymerization reactor from the metering device;

passing a free radical polymerization initiator into the polymerization reactor before and/or during the addition of the hydrolysable monomer into the polymerization reactor, wherein the hydrolysable monomer and the polyether macromonomer are reacted in the aqueous medium polymerization reaction mixture by free radical polymerization with formation of the non-ionic copolymer; and, subjecting the reaction mixture to polymerization while an addition rate of the hydrolysable monomer and/or at least a component of the free radical polymerization initiator is varied stepwise or continuously;

wherein no monomer is introduced into the polymerization reactor to incorporate ionic cement binding sites into the non-ionic copolymer prior to mixing the copolymer in an alkaline aqueous environment (including but not limited to a cementitious composition).

In certain embodiments, at least 70 mol % of the polyether macromonomer initially introduced into the polymerization reactor is converted by free radical polymerization.

The hydrolysable monomers include monomers that are capable of free radical polymerization, having at least one carbon double bond. In the present context, polyether macromonomers are compounds capable of free radical polymerization and having at least one carbon double bond and at least two ether oxygen atoms. In certain embodiments, the polyether macromonomer moieties present in the copolymer have side chains that contain at least two ether oxygen atoms.

It is not necessary, although it is possible, initially to introduce all polyether macromonomer reacted by free radical polymerization in the polymerization reactor into the polymerization reactor before the hydrolysable monomer is metered in. However, in certain embodiments at least 50 mol %, in other embodiments at least 80 mol %, and in many other embodiments about 100% of the polyether macromonomer moieties are incorporated into the copolymer by reaction of polyether macromonomer which is initially introduced into the polymerization reactor before the hydrolysable monomer is metered in. The polyether macromonomer then optionally remaining may be fed continuously to the polymerization reactor while the hydrolysable monomer is being metered in. Polyether macromonomer can be fed to the polymerization reactor separately from the hydrolysable monomer and/or as a mixture with the hydrolysable monomer (by, for example, also initially introducing polyether macromonomer in addition to the hydrolysable monomer into the metering device).

The metering device may have various forms and can be manually and/or automatically controlled.

According to this synthesis process, including selective metering, it is possible to prepare uniform copolymers, and to do so with respect to molecular weight (low polydispersity index of the molecular weight distribution) and with regard to the relative proportion of the monomer moieties in the copolymer (chemical uniformity). This uniformity of the non-ionic copolymer results in the same being particularly suitable as a workability retention admixture for hydraulic binders. The process can also be regarded as being economical, as a good effect is achieved with only little metering effort, resulting from "high metering efficiency".

It is therefore possible to achieve a more homogeneous distribution of the monomer residues in the copolymer for the sake of better performance with respect to workability as measured by slump retention once the copolymers are introduced into the cementitious composition and subsequently hydrolyze.

In addition to the hydrolysable monomer and the polyether macromonomer, further monomer types may also be used. In certain embodiments, these may be reacted so that in practice a vinylically or ethylenically unsaturated compound is passed into the polymerization reactor as monomeric starting material, which compound is reacted by polymerization.

In one embodiment, polyether macromonomer is initially introduced into the polymerization reactor in an amount per mole of hydrolysable monomer to be metered in, such that an arithmetic mean molar ratio of hydrolysable monomer residues to polyether macromonomer residues of 10:1 to 1:1, and in other embodiments a molar ratio of 9:1 to 1:1, is established in the copolymer formed.

In certain embodiments, a redox initiator or redox initiator system is used as the free radical polymerization initiator. The $H_2O_2/FeSO_4$ combination may be used as the redox initiator system, in certain embodiments together with a reducing agent. Sodium sulphite, the disodium salt of 2-hydroxy-2-sulphinatoacetic acid, disodium salt of 2-hydroxy-2-sulphonatoacetic acid, sodium hydroxymethanesulphinate, ascorbic acid, isoascorbic acid or mixtures thereof are suitable as reducing agents within the redox initiator system. Other systems are also suitable as the redox initiator system, for example those which are based on tert-butyl hydroperoxide, ammonium peroxodisulphate or potassium peroxodisulphate.

In one embodiment, initiator components, e.g. $H_2O_2$, and the polyether macromonomer are passed simultaneously in premixed form (such as in one stream) into the polymerization reactor.

In principle, however, all compounds decomposing into free radicals under polymerization conditions can be used as initiators, such as, for example, peroxides, hydroperoxides, persulphates, azo compounds and perphosphates. When the free radical formers are combined with suitable reducing agents, known redox systems or redox catalysts are obtained. Suitable reducing agents are, for example, sodium sulphite, the disodium salt of 2-hydroxy-2-sulphonatoacetic acid, the disodium salt of 2-hydroxy-2-sulphinatoacetic acid, sodium hydroxymethanesulphinate, ascorbic acid, iso-ascorbic acid, amines, such as diethanolamine or triethanolamine, hydroxylamine or mixtures thereof. In some embodiments, water-soluble salts of transition metals, such as iron, cobalt, nickel or silver, may be additionally employed with the use of redox systems or catalysts, and in certain embodiments, iron salts (present predominantly in divalent form) may be used.

In general, a component of the redox initiator system and/or reducing agent may be passed into the polymerization reactor after the polymerization pH has been established, and during the metering in of the hydrolysable monomer.

The polymerization pH in the aqueous medium may be established so that, with regard to the free radical polymerization initiator used, the free radical formation per unit time (free radical yield) is high or approximately at a maximum. The polymerization initiator or the polymerization initiator system used, thus influences and helps to approximately determine the polymerization pH.

Typically, the aqueous medium is in the form of an aqueous solution. The polymerization pH may be about 4.5 to about 7.1, and the temperature of the aqueous medium during the free radical polymerization is 0 to about 90° C., in certain embodiments about 10 to 35° C. The desired polymerization pH in the aqueous medium in the reactor may be established by adding a base or an acid to the polymerization reactor and/or to the metering device.

The polymerization reactor may comprise a semicontinuously stirred tank.

In certain embodiments, at least 80 mol % to at least 90 mol %, of the polyether macromonomer initially introduced into the polymerization reactor is converted by the free radical polymerization.

Generally, at least 70 mol % of the polyether macromonomer having been initially introduced into the polymerization reactor, the hydrolysable monomer is added into the polymerization reactor in an amount per unit time such that the uniformity of the mole ratio of the constituent monomer residues in the copolymer chains is controlled.

In some embodiments, the hydrolysable monomer is initially introduced together with water into the metering unit, and an aqueous solution of the hydrolysable monomer is metered from the metering unit into the polymerization reactor. In general, a chain regulator, or chain transfer agent, which may be present in dissolved form, is passed into the polymerization reactor. The process may therefore include passing a chain transfer agent into the polymerization reactor, before and/or during the addition of the hydrolysable monomer into the polymerization reactor.

Suitable chain transfer agents include, among others, thiol type compounds such as but not limited to mercaptoethanol, thioglycerol, thioglycolic acid, 2-mercaptopropionic acid, 3-mercaptopropionic acid, thiomalic acid, octylthioglycolic acid, octyl 3-mercaptopropionic acid, and 2-mercaptoethanesulfonic acid. Chain transfer agents may be used either singly or in the form of a mixture of two or more. In certain embodiments, the chain transfer agent is present as a water soluble compound and is passed into the polymerization reactor in the form of an aqueous solution. The aqueous solution may contain at least 10% by weight of water.

When ether-based monomer(s), such as polyether macromonomer(s), is used as Component B and/or Component C, and there is a reactivity difference between those monomers and the hydrolysable monomers of Component A such that the self-polymerizability (homopolymerizability) of Components B or C is lower and the homopolymerizability of Component A is higher, then Component B and/or Component C may be difficult to be continuously incorporated in a copolymer and either the added Component A is preferentially polymerized, or only the Component A is polymerized, with a resulting decrease of reaction rate of Component B and/or Component C.

A process is therefore provided for producing a non-ionic copolymer by polymerizing polyether macromonomer and hydrolysable monomer, comprising adding at least a portion of the polyether macromonomer with low reactivity into a reactor in advance and subsequently adding thereto a hydrolysable monomer with higher reactivity to form a polymerization reaction mixture, and subjecting the reaction mixture to polymerization while an addition rate of the hydrolysable monomer with high reactivity, and/or at least a component of the free radical polymerization initiator such as a reducing agent for a redox initiator system, is varied stepwise or continuously, with either increasing and/or decreasing addition rates.

As a result, a copolymer with more uniform monomer composition, lower polydispersity index (PDI), or a blend of a plurality of copolymers with different monomer ratios can easily be produced by one polymerization operation by making the addition rate at the later stage faster or lower. For example, when the addition rate of the hydrolysable monomer Component A is made slower at the later step, a copolymer with more uniform monomer molar ratio in a mixture can be produced.

In one embodiment, at least one ethylenically unsaturated polyoxyalkylene ether-based monomer (Component B and/or C) is added into a reactor in advance, and at least one ethylenically unsaturated hydrolysable monomer (Component A) is added thereto with an addition rate that changes at least one time.

Each of the monomers of Component A and Components B and/or C may be used alone or in a mixture of two or more monomers. In addition to the monomers of Components A, B and C, further unsaturated monomers of Component D may be used, either alone or in a mixture of two or more monomers.

The ethylenically unsaturated monomer(s) of Components B and/or C may be initially added in advance into a reactor in their whole amount before starting the copolymerization with the ethylenically unsaturated monomer of Component A, in one embodiment before the addition of any of the monomer(s) of Component A, and in other embodiments before the addition of the monomer(s) of Component A and the polymerization initiator. However the polymerization reaction mixture may contain a portion of the monomers of Components B and/or C together with Component A before polymerization is commenced, and portion of the monomers of Components B and/or C may be co-fed with the monomer(s) of Component A during the stepwise addition.

The number of times to change the addition rate of the monomer(s) of Component A is not limited and can be properly selected depending on the desired characteristics of the non-ionic copolymer to be produced. When the addition rate of the monomer(s) of Components B and/or C is changed stepwise in the present method, the addition of the monomer(s) in any step in which the monomer is added at a constant rate, may itself be performed continuously, semicontinuously, and/or stepwise.

Timing of adding the monomer(s) of Component D, when used, is not limited as long as the timing allows such monomer(s) to copolymerize with the monomers of Component A and Components B and/or C efficiently to produce the desired blend of copolymers. By way of example and not limitation, the monomer(s) of Component D may be added into a reactor in advance together with the monomer(s) of and Components B and/or C, or may be added with the monomer(s) of Component A continuously or stepwise, or may be added after completion of the addition of the monomer(s) of Component A.

In one embodiment, between about 50 and about 70 percent of the monomer(s) of Component A are introduced into the reactor during the first reaction period, by way of example but not limitation, during the first 10 minutes following initiation of the polymerization reaction (including monomers added prior to initiation of polymerization). During the second reaction period, again by way of example but not limitation, of 10 minutes, the addition rate of the of Component A monomer(s) decreased such that about 25 to about 35 percent of the total Component A was added to the reactor. During the third and final illustrative 10 minute reaction period, the addition rate of the Component A monomer(s) is again decreased so that the remaining about 5 to about 15 percent is added to the reactor.

Examples of ethylenically unsaturated monomers capable of forming hydrolysable monomer residues comprising Component A that can be copolymerized include but are not limited to unsaturated monocarboxylic acid ester derivatives such as alkyl acrylates such as methyl acrylate, ethyl acrylate, propyl acrylate, and butyl acrylate; alkyl methacrylates such as methyl methacrylate, ethyl methacrylate, propyl methacrylate, and butyl methacrylate; hydroxyalkyl acrylates such as hydroxyethyl acrylate, hydroxypropyl acrylate, and hydroxybutyl acrylate; hydroxyalkyl methacrylates such as hydroxyethyl methacrylate, hydroxypropyl methacrylate, and hydroxybutyl methacrylate; acrylamide, methacrylamide, and derivatives thereof; maleic acid alkyl or hydroxyalkyl diesters; maleic anhydride or maleimide for copolymers to be stored in the dry phase.

Examples of ethylenically unsaturated monomers capable of forming monomer residues comprising Components B and/or C that can be copolymerized, whether hydrolysable or non-hydrolysable, include unsaturated monocarboxylic acid ester derivatives such as polyethylene glycol mono(meth)acrylate, polypropylene glycol (meth)acrylate, polybutylene glycol (meth)acrylate, polyethylene glycol polypropylene glycol mono(meth)acrylate, polyethylene glycol polybutylene glycol mono(meth)acrylate, polypropylene glycol polybutylene glycol mono(meth)acrylate, polyethylene glycol polypropylene glycol polybutylene glycol mono(meth)acrylate, methoxypolyethylene glycol mono(meth)acrylate, methoxypolypropylene glycol mono(meth)acrylate, methoxypolybutylene glycol mono(meth)acrylate, methoxypolyethylene glycol polypropylene glycol mono(meth)acrylate, methoxypolyethylene glycol polybutylene glycol mono(meth)acrylate, methoxypolypropylene glycol polybutylene glycol mono(meth)acrylate, methoxypolyethylene glycol polypropylene glycol polybutylene glycol mono(meth)acrylate, ethoxypolyethylene glycol mono(meth)acrylate, ethoxypolypropylene glycol mono(meth)acrylate, ethoxypolybutylene glycol mono(meth)acrylate, ethoxypolyethylene glycol polypropylene glycol mono(meth)acrylate, ethoxypolyethylene glycol polybutylene glycol mono(meth)acrylate, ethoxypolypropylene glycol polybutylene glycol mono(meth)acrylate, ethoxypolyethylene glycol polypropylene glycol polybutylene glycol mono(meth)acrylate, and higher alkoxy derivatives of the above mentioned polyoxyalkylenes;

vinyl alcohol derivatives such as polyethylene glycol mono(meth)vinyl ether, polypropylene glycol mono(meth)vinyl ether, polybutylene glycol mono(meth)vinyl ether, polyethylene glycol polypropylene glycol mono(meth)vinyl ether, polyethylene glycol polybutylene glycol mono(meth)vinyl ether, polypropylene glycol polybutylene glycol mono(meth)vinyl ether, polyethylene glycol polypropylene glycol polybutylene glycol mono(meth)vinyl ether, methoxypolyethylene glycol mono(meth)vinyl ether, methoxypolypropylene glycol mono(meth)vinyl ether, methoxypolybutylene glycol mono(meth)vinyl ether, methoxypolyethylene glycol polypropylene mono(meth)vinyl ether, methoxypolyethylene glycol polybutylene glycol mono(meth)vinyl ether, methoxypolypropylene glycol polybutylene glycol mono(meth)vinyl ether, methoxypolyethylene glycol polypropylene glycol polybutylene glycol mono(meth)vinyl ether, ethoxypolyethylene glycol mono(meth)vinyl ether, ethoxypolypropylene glycol mono(meth)vinyl ether, ethoxypolybutylene glycol mono(meth)vinyl ether, ethoxypolyethylene glycol polypropylene glycol mono(meth)vinyl ether, ethoxypolyethylene glycol polybutylene glycol mono(meth)vinyl ether, ethoxypolypropylene glycol polybutylene glycol mono(meth)vinyl ether, ethoxypolyethylene glycol polypropylene glycol polybutylene glycol mono(meth)vinyl ether, and the like;

(meth)allyl alcohol derivatives such as polyethylene glycol mono(meth)allyl ether, polypropylene glycol mono(meth)allyl ether, polybutylene glycol mono(meth)allyl ether, polyethylene glycol polypropylene glycol mono(meth)allyl ether, polyethylene glycol polybutylene glycol mono(meth)allyl ether, polypropylene glycol polybutylene glycol mono(meth) allyl ether, polyethylene glycol polypropylene glycol polybutylene glycol mono(meth)allyl ether, methoxypolyethylene glycol mono(meth)allyl ether, methoxypolypropylene glycol mono(meth)allyl ether, methoxypolybutylene glycol mono(meth)allyl ether, methoxypolyethylene glycol polypropylene glycol mono(meth)allyl ether, methoxypolyethylene glycol polybutylene glycol mono(meth)allyl ether, methoxypolypropylene glycol polybutylene glycol mono (meth)allyl ether, methoxypolyethylene glycol polypropylene glycol polybutylene glycol mono(meth)allyl ether, ethoxypolyethylene glycol mono(meth)allyl ether, ethoxypolypropylene glycol mono(meth)allyl ether, ethoxypolybutylene glycol mono(meth)allyl ether, ethoxypolyethylene glycol polypropylene glycol mono(meth)allyl ether, ethoxypolyethylene glycol polybutylene glycol mono(meth)allyl ether, ethoxypolypropylene glycol polybutylene glycol mono (meth)allyl ether, ethoxypolyethylene glycol polypropylene glycol polybutylene glycol mono(meth)allyl ether, and the like;

adducts of 1 to 350 moles of alkylene oxide with an unsaturated alcohol such as 3-methyl-3-buten-1-ol, 3-methyl-2-buten-1-ol, 2-methyl-3-buten-2-ol, 2-methyl-2-buten-1-ol, and 2-methyl-3-buten-1-ol, either alone respectively or in combinations with each other, including but not limited to polyethylene glycol mono (3-methyl-3-butenyl) ether, polyethylene glycol mono (3-methyl-2-butenyl) ether, polyethylene glycol mono (2-methyl-3-butenyl) ether, polyethylene glycol mono (2-methyl-2-butenyl) ether, polyethylene glycol mono (1,1-dimethyl-2-propenyl) ether, polyethylene polypropylene glycol mono (3-methyl-3-butenyl) ether, polypropylene glycol mono (3-methyl-3-butenyl) ether, methoxypolyethylene glycol mono (3-methyl-3-butenyl) ether, ethoxypolyethylene glycol mono (3-methyl-3-butenyl) ether, 1-propoxypolyethylene glycol mono (3-methyl-3-butenyl) ether, cyclohexyloxypolyethylene glycol mono (3-methyl-3-butenyl) ether, 1-ocyloxypolyethylene glycol mono (3-methyl-3-butenyl) ether, nonylalkoxypolyethylene glycol mono (3-methyl-3-butenyl) ether, laurylalkoxypolyethylene glycol mono (3-methyl-3-butenyl) ether, stearylalkoxypolyethylene glycol mono (3-methyl-3-butenyl) ether, and phenoxypolyethylene glycol mono (3-methyl-3-butenyl) ether, and the like.

Examples of ethylenically unsaturated monomers capable of forming non-hydrolysable monomer residues comprising Component D include styrene, ethylene, propylene, isobutene, alpha-methyl styrene, methyl vinyl ether, and the like.

No monomer is added to the copolymer to introduce charge into the molecule prior to hydrolysis of the hydrolysable moiety of the Component A monomer residue in an alkaline environment, including but not limited to the cementitious composition.

The subject non-ionic copolymer may have a weight average molecular weight of about 5,000 to about 150,000, in some embodiments about 25,000 to about 55,000.

The subject non-ionic copolymer can be added to the cementitious mixture with the initial batch water or as a delayed addition, in a dosage range of about 0.01 to about 3 percent copolymer based on the weight of cementitious materials, and in certain embodiments, about 0.02 to about 1 weight percent copolymer based on the weight of cementitious materials.

The present process utilizing the subject non-ionic copolymers may be used in ready mix or pre-cast applications to provide differentiable workability retention and all of the benefits associated therewith. Suitable applications include flatwork, paving (which is typically difficult to air entrain by conventional means), vertical applications, and precast articles. Further, the subject non-ionic copolymers have shown particular value in workability retention of highly filled cementitious mixtures such as those containing large amounts of inert fillers, including but not limited to limestone powder. By "highly filled" is meant that the fillers, discussed in more detail below, comprise greater than about 10 weight percent, based on the weight of cementitious material (hydraulic cement).

The subject non-ionic copolymers may be used in combination with at least one type of water reducing composition, referred to generally as dispersants, to provide a combination of early workability, water reduction and extended workability. In various embodiments, the dispersant may be at least one of traditional water reducers such as lignosulfonates, melamine sulfonate resins, sulfonated melamine formaldehyde condensates, salts of sulfonated melamine sulfonate condensates, beta naphthalene sulfonates, naphthalene sulfonate formaldehyde condensate resins, or salts of sulfonated naphthalene sulfonate condensates; or, conventional polycarboxylate, polyaspartate, or oligomeric dispersants.

Examples of polycarboxylate dispersants can be found in U.S. Publication No. 2002/0019459 A1, U.S. Publication No. 2006/0247402 A1, U.S. Pat. No. 6,267,814, U.S. Pat. No. 6,290,770, U.S. Pat. No. 6,310,143, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516, U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583,183, U.S. Pat. No. 6,777,517, U.S. Pat. No. 6,762,220, U.S. Pat. No. 5,798,425, and U.S. Pat. No. 5,393,343, which are all incorporated herein by reference, as if fully written out below.

Examples of polyaspartate dispersants can be found in U.S. Pat. No. 6,429,266; U.S. Pat. No. 6,284,867; U.S. Pat. No. 6,136,950; and U.S. Pat. No. 5,908,885, which are all incorporated herein by reference, as if fully written out below.

Examples of oligomeric dispersants can be found in U.S. Pat. No. 6,133,347; U.S. Pat. No. 6,451,881; U.S. Pat. No. 6,492,461; U.S. Pat. No. 6,861,459; and U.S. Pat. No. 6,908,955, which are all incorporated herein by reference, as if fully written out below.

When used in combination with a traditional water reducing dispersant or a conventional polycarboxylate, polyaspartate, or oligomeric dispersant in order to provide initial slump and to tailor workability of a cementitious mixture for a specific application, the subject non-ionic copolymer can be added to the cementitious mixture with the initial batch water or as a delayed addition, in a dosage range of about 0.01 to about 3 weight percent non-ionic copolymer based on the weight of cementitious materials, and in certain embodiments, about 0.02 to about 1 weight percent copolymer, and the traditional water reducing dispersant or conventional dispersant can be added to the cementitious mixture with the initial batch water or as a delayed addition to the cementitious mixture, in a dosage range of about 0.01 to about 3 weight percent dispersant based on the weight of cementitious materials, and in certain embodiments, about 0.02 to about 1 weight percent dispersant.

The cementitious compositions described herein may contain other additives or ingredients and should not be limited to the stated or exemplified formulations. Cement additives that can be added independently include, but are not limited to: air entrainers, aggregates, pozzolans, other fillers, set and strength accelerators/enhancers, set retarders, water reducers, corrosion inhibitors, wetting agents, water soluble polymers, rheology modifying agents, water repellents, fibers, damp-proofing admixtures, permeability reducers, pumping aids, fungicidal admixtures, germicidal admixtures, insecticide admixtures, finely divided mineral admixtures, alkali-reactivity reducer, bonding admixtures, shrinkage reducing admixtures, and any other admixture or additive that does not adversely affect the properties of the cementitious composition. The cementitious compositions need not contain one of each of the foregoing additives.

Aggregate can be included in the cementitious formulation to provide for mortars which include fine aggregate, and concretes which also include coarse aggregate. The fine aggregates are materials that almost entirely pass through a Number 4 sieve (ASTM C125 and ASTM C33), such as silica sand. The coarse aggregates are materials that are predominantly retained on a Number 4 sieve (ASTM C125 and ASTM C33), such as silica, quartz, crushed marble, glass spheres, granite, limestone, calcite, feldspar, alluvial sands, sands or any other durable aggregate, and mixtures thereof Fillers for cementitious compositions may include aggregate, sand, stone, gravel, pozzolan, finely divided minerals, such as raw quartz, limestone powder, fibers, and the like, depending upon the intended application. As non-limiting examples, stone can include river rock, limestone, granite, sandstone, brownstone, conglomerate, calcite, dolomite, marble, serpentine, travertine, slate, bluestone, gneiss, quartzitic sandstone, quartzite and combinations thereof.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, slag, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Fly ash is defined in ASTM C618.

If used, silica fume can be uncompacted or can be partially compacted or added as a slurry. Silica fume additionally reacts with the hydration byproducts of the cement binder, which provides for increased strength of the finished articles and decreases the permeability of the finished articles. The silica fume, or other pozzolans such as fly ash or calcined clay such as metakaolin, can be added to the cementitious mixture in an amount from about 5% to about 70% based on the weight of cementitious material.

The present process is useful in the production of precast, ready mix, and/or highly filled cementitious compositions.

Precast Cementitious Compositions:

The term "precast" cementitious compositions or precast concrete refers to a manufacturing process in which a hydraulic cementitious binder, such as Portland cement, and aggregates, such as fine and course aggregate, are placed into a mold and removed after curing, such that the unit is manufactured before delivery to a construction site.

Precast applications include, but are not limited to, precast cementitious members or parts such as beams, double-Ts, pipes, insulated walls, prestressed concrete products, and other products where the cementitious composition is poured directly into forms and final parts are transported to job sites.

The production of precast cementitious members usually involves the incorporation of steel reinforcement. The reinforcement may be present as structural reinforcement due to the designed use of the member in which it is included, or the steel may simply be present to allow for a member (such as a curtain wall panel) to be stripped from its mold without cracking As used herein, "pre-stressed" concrete refers to concrete whose ability to withstand tensile forces has been improved by using prestressing tendons (such as steel cable or rods), which are used to provide a clamping load producing a compressive strength that offsets the tensile stress that the concrete member would otherwise experience due to a bending load. Any suitable method known in the art can be used to pre-stress concrete. Suitable methods include, but are not limited to pre-tensioned concrete, where concrete is cast around already tensioned tendons, and post-tensioned concrete, where compression is applied to the concrete member after the pouring and curing processes are completed.

In certain precast applications, it is desired that the cementitious composition mixture have sufficient fluidity that it flows through and around the reinforcement structure, if any, to fill out the mold and level off at the top of the mold, and consolidates without the use of vibration. This technology is commonly referred to as self-consolidating concrete (SCC). In other embodiments, the mold may need to be agitated to facilitate the leveling-off of the mixture, such as by vibration molding and centrifugal molding. In addition to the requirement for workability retention, there is a requirement for the cementitious composition to achieve fast setting times and high early strength.

With respect to precast applications, the term "high early strength" refers to the compressive strength of the cementitious mass within a given time period after pouring into the mold. Therefore, it is desirable that the cementitious composition mixture has initial fluidity and maintains fluidity until placement, but also has high early strength before and by the time that the precast concrete units are to be removed from the mold.

High early-strength reinforced pre-cast or cast in place cementitious members produced without metal bar, metal fiber or metal rod reinforcement that comprise hydraulic cement, polycarboxylate dispersant, and structural synthetic fibers are disclosed in commonly owned U.S. Pat. No. 6,942,727, incorporated herein by reference.

To achieve the high strengths of precast cementitious compositions, very low water to cement ratios are used. This necessitates a significant amount of high-range water reducer (HRWR) to produce a workable mixture. Traditional HRWR chemistry such as naphthalene sulfonate formaldehyde condensates will potentially retard set at such high dosages, and thereby inhibit the development of the high early strength necessary for stripping the member from the mold.

Typically early-strength development refers to compressive strengths being achieved in 12-18 hours after placing the unset cementitious composition in the mold.

To achieve a rapid level of strength development in the formation of pre-cast cementitious members without an external heat source, traditional dispersant chemistries would not be successful because of their excessive retarding effect on cement hydration.

In precast applications, the water to cement ratio is typically above about 0.2 but less than or equal to about 0.45.

A process is provided for making cast in place and pre-cast cementitious members. The method comprises mixing a cementitious composition comprising hydraulic cement, such as portland cement, and the above described non-ionic copolymers with water, and optionally coarse aggregate, fine aggregate, structural synthetic fibers, or other additives, such as additives to control shrinkage and/or alkali-silica reaction, then forming the member from the mixture. Forming can be any conventional method, including placing the mixture in a mold to set or cure and stripping away the mold.

The precast cementitious members or articles formed by the above process can be used in any application but are useful for architectural, structural and non-structural applications. As examples but not by way of limitation, the precast articles can be formed as wall panels, beams, columns, pipes, manholes (inclined walls), segments, precast plates, box culverts, pontoons, double-Ts, U-tubes, L-type retaining walls, beams, cross beams, road or bridge parts and various blocks or the like. However, the precast concrete articles are not limited to such specific examples.

Ready Mix and Highly Filled Cementitious Compositions:

As used herein, the term "ready mix" refers to cementitious composition that is batch mixed or "batched" for delivery from a central plant instead of being mixed on a job site. Typically, ready mix concrete is tailor-made according to the specifics of a particular construction project and delivered ideally in the required workability in "ready mix concrete trucks".

Over the years, the use of fillers and/or pozzolanic materials as a partial replacement for portland cement in concrete has become an increasingly attractive alternative to portland cement alone. The desire to increase the use of inert fillers and/or fly ash, blast furnace slag, and natural pozzolanic cement in concrete mixtures can be attributed to several factors. These include cement shortages, economic advantages of portland cement replacement, improvements in permeability of the concrete product, and lower heats of hydration.

Despite the cost and performance advantages of using inert or pozzolanic materials as partial replacements of portland cement in concrete, there are practical limitations to the amount at which they can be used in the cementitious mixture. Using these materials at higher levels, such as above about 10 weight percent based on the weight of the portland cement, can result in the retarded setting time of the concrete up to several hours, and perhaps longer depending upon the ambient temperature. This incompatibility puts a burden of increased costs and time on the end user, which is unacceptable.

While it is known to use set time accelerators in concrete mixtures, these accelerator admixtures have been problematic, particularly when used with water reducing admixtures, so that set time cannot be decreased to an acceptable level. The use of accelerators with water reducers, such as naphthalene sulfonate formaldehyde condensates, lignin and substituted lignins, sulfonated melamine formaldehyde condensates and the like, has been ineffective to produce an acceptable highly filled or pozzolanic replacement containing hydraulic cement based cementitious mixture with normal setting characteristics and an acceptable resulting concrete.

The subject nonionic copolymers in combination with a traditional dispersant or a conventional polycarboxylate dispersant in cementitious compositions exhibit superior workability retention without retardation, minimize the need for slump adjustment during production and at the jobsite, minimize mixture over-design requirements, reduce re-dosing of high-range water-reducers at the jobsite, and provide high flowability and increased stability and durability.

Slump is a measure of the consistency of concrete, and is a simple means of ensuring uniformity of concrete on-site. To determine slump, a standard size slump cone is filled with fresh concrete. The cone is then removed, and the "slump" is the measured difference between the height of the cone and the collapsed concrete immediately after removal of the slump cone.

EXAMPLES

Specific embodiments of non-ionic copolymers were tested according to the examples set forth below, and compared with traditional dispersants and conventional polycarboxylate dispersants. Conventional polycarboxylate dispersants typically comprise copolymers of carboxylic acid, derivatized carboxylic acid esters, and/or derivatized alkenyl ethers. The derivatives, or side chains, are generally long (greater than about 500 MW) and are generally not readily hydrolysable from the polymer backbone in cementitious compositions.

Synthesis Example Copolymer A

A glass reactor vessel equipped with multiple necks, a mechanical stirrer, pH-meter and dosing equipment (e.g. syringe pump) was charged with 138 g water and 182 g of molten vinyl-PEG 1100 (solution A). The temperature in the reactor was adjusted to 12° C. and the pH was adjusted to approximately 7 by addition of 4 g of 25% sulfuric acid solution.

A portion (59.63 g) of a previously prepared second solution, (solution B), consisting of 228.17 g water and 79.22 g of hydroxyethyl acrylate (HEA, 98.5%) was added to the reactor vessel drop wise over a period of 10 minutes while stirring moderately. A pH of 6.5 was measured for the resulting solution in the reactor. To the remaining solution B was added 2.28 g 3-mercaptopropionic acid (3-MPA). A further amount of 0.76 g 3-MPA was added to the reactor shortly before initiation of polymerization. A third solution, (solution C) containing 1.5 g of sodium hydroxymethane sulfinate dihydrate in 48.5 g water was prepared. The polymerization was initiated by adding 31 mg $FeSO_4 \times 7H_2O$ in several milliliters of water and 2.01 g of $H_2O_2$ (30%) solution to the reaction vessel. Simultaneously, the dosing of solution B and C was started into the polymerization vessel. Solution B was dosed over a period of 30 minutes using varying addition rates as described in the table below. Solution C was dosed at a constant speed of 4.5 g/h over a period of 30 min followed by a higher dosing speed of 75 g/h over an additional 6 minutes. During the 30 minute dosing period of solution B, the pH in the reactor was maintained at 6.5 by adding 20% aqueous NaOH solution. The pH of the polymer solution after the addition of solution C was 7.1 and 0.24 g of 25% sulfuric acid solution was added to adjust the pH to 7. An aqueous solution of a polyether-polyester copolymer with a yield of 97.7%, a weight-average molecular weight of 37,300 g/mole, a PDI of 1.91 as determined by SEC and a solids content of 38.9% was obtained.

| Ramp Table A | | | | | | | | | | | |
|---|---|---|---|---|---|---|---|---|---|---|---|
| t (min) | | | | | | | | | | | |
| | 0 | 2 | 4 | 8 | 10 | 12 | 14 | 16 | 18 | 22 | 26 | 30 |
| g/h | 728 | 808 | 843 | 808 | 728 | 594 | 488 | 390 | 301 | 186 | 115 | 0 |

Synthesis Example Copolymer B

A glass reactor vessel equipped with multiple necks, a mechanical stirrer, pH-meter and dosing equipment (e.g. syringe pump) was charged with 267 g of water and 330.9 g of molten vinyl-PEG 3000 (solution A). The temperature in the reactor was adjusted to 13° C. and the pH was adjusted to approximately 7 by addition of 3 g of 25% sulfuric acid solution.

A portion (20.5 g) of a previously prepared second solution (solution B), consisting of 152.11 g water and 52.82 g of hydroxyethyl acrylate (HEA, 98.5%) was added to the reactor vessel drop wise over a period of 10 minutes under moderate stirring. A pH of 6.8 was measured for the resulting solution in the reactor. To the remaining solution B was added 2.9 g 3-mercaptopropionic acid (3-MPA). A further amount of 0.52 g 3-MPA was added to the reactor shortly before initiation of polymerization. A third solution, (solution C) containing 1.5 g of sodium hydroxymethane sulfinate dihydrate in 48.5 g water was prepared. The polymerization was initiated by adding 21 mg $FeSO_4 \times 7H_2O$ that was dissolved in several milliliters of water and 1.34 g of $H_2O_2$ (30%) solution to the reaction vessel. Simultaneously, the dosing of solution B and C into the polymerization vessel was started. Solution B was dosed over a period of 30 minutes using varying addition rates as described in the table below. Solution C was dosed at a constant speed of 1.54 g/h over a period of 30 minutes followed by a higher dosing speed of 50 g/h over an additional 10 minutes. During the 30 minute dosing period of solution B, the pH in the reactor was maintained at 6.8 by adding 20% aqueous NaOH solution. The pH of the polymer solution after the addition of solution C was 7.1 and 0.2 g of 25% sulfuric acid was added to adjust the pH to 7. An aqueous solution of a polyether-polyester copolymer with a yield of 91%, a weight-average molecular weight of 37,000 g/mole, a PDI of 1.47 as determined by SEC and a solids content of 46.8% was obtained.

affecting admixture and defoamer into the mix water in the amounts listed in Table 1 below. The stone, cement and sand were added in the amounts shown in Table 1, and the mixture was mixed for five minutes at 20 rpm in a drum mixer. The slump of a sample of this mixture was tested (test duration approximately two minutes), and mixing resumed within five minutes, at four rpm. Mixing cycles of 20 minutes followed by test cycles of five minutes were repeated to generate the data shown in Table 1. The composition of Example 1 included Copolymer A having Component A hydroxyethylacrylate residues and Component B polyethylene glycol vinyl ether residues in a molar ratio of 4:1, that of Example 2 included Copolymer B having Component A hydroxyethylacrylate residues and Component C polyethylene glycol vinyl ether residues in a molar ratio of 4:1, that of Comparative Example 3 contained no slump affecting admixture or defoamer, and the compositions of Comparative Examples 4 and 5 included conventional polycarboxylate dispersants.

The slump of the test compositions was determined by placing a cone on a flat surface, filling the cone with the cementitious composition, and removing the cone, as described in ASTM C143. The composition would then flow, and the displaced height (slump) of the resulting mound of the cementitious composition, as well as the diameter (slump flow) of the base of the mound, were measured in inches.

Figure 2:
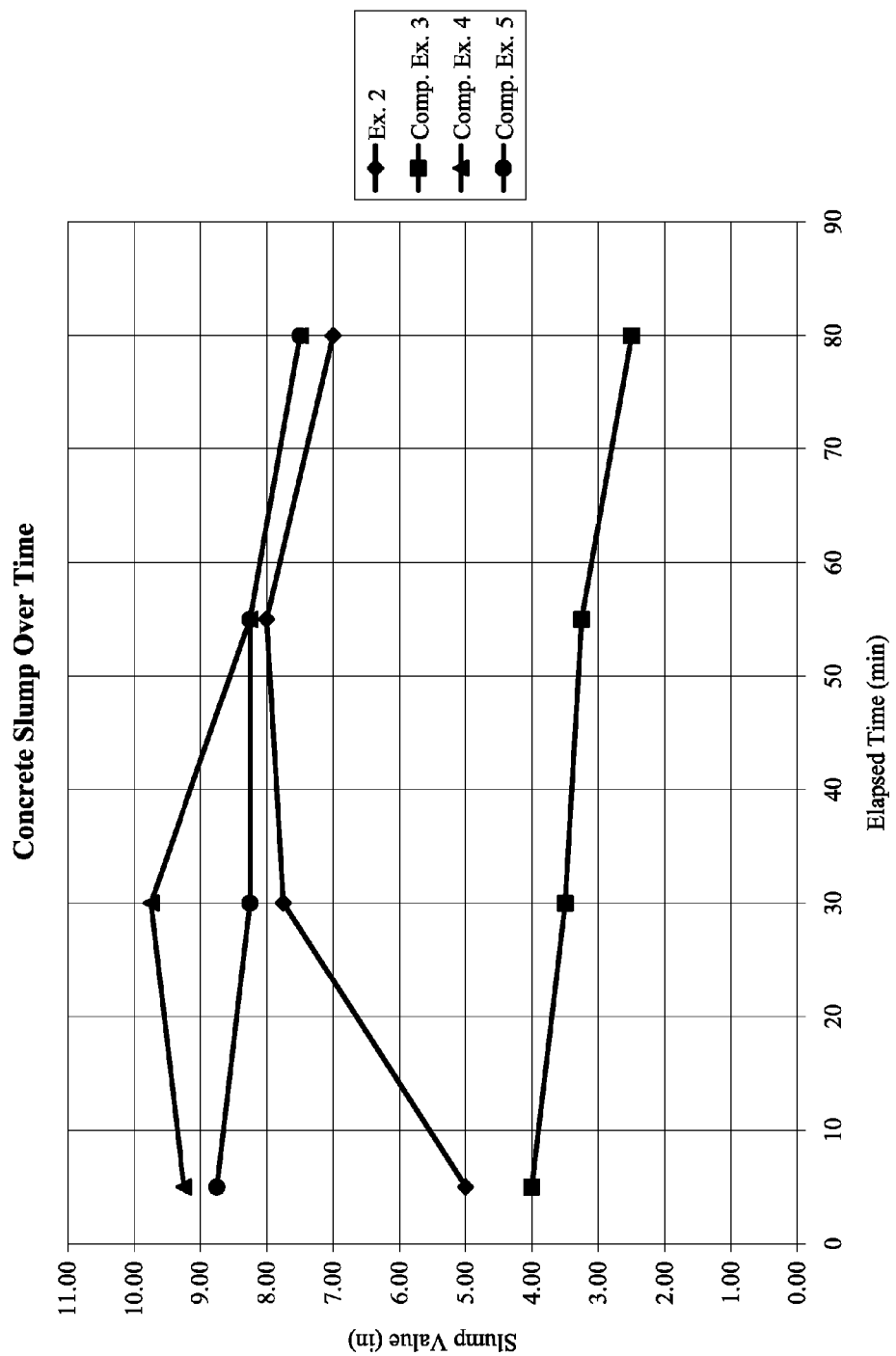
FIG. 2 is a graphical representation of concrete slump versus time achieved by the use of a subject copolymer as compared to conventional polycarboxylate dispersants and no slump-affecting admixture.

The workability of each cementitious composition, as represented by its slump, was determined according to ASTM C143, reported in Table 1, below. The slump diameter, or diameter of the base of the slumped concrete, of each composition was also measured, as well as the air content (ASTM C231), reported in Table 1. As shown in Table 1 and FIGS. 1 and 2, Copolymers A and B used in Examples 1 and 2 had initial slump measurements comparable to the additive-free control composition of Comparative Example 3, however, workability increased and was maintained over time. In contrast, the conventional polycarboxylate dispersants utilized in

| Ramp Table B | | | | | | | | | | | |
|---|---|---|---|---|---|---|---|---|---|---|---|
| t (min) | | | | | | | | | | | |
| | 0 | 2 | 4 | 8 | 10 | 12 | 14 | 16 | 18 | 22 | 26 | 30 |
| g/h | 549 | 609 | 635 | 609 | 549 | 448 | 368 | 294 | 227 | 140 | 87 | 0 |

Examples 1 and 2 and Comparative Examples 3, 4 and 5

Sample cementitious compositions suitable for use in precast applications were prepared by first introducing a slump Comparative Examples 4 and 5, developed maximum workability quickly, and tended to lose workability over time. In this respect, the Copolymers A & B demonstrated performance characteristics opposite to those of the conventional dispersants.

TABLE 1

| | Ex. 1 | Ex. 2 | Comp. Ex. 3 | Comp. Ex. 4 | Comp. Ex. 5 |
|---|---|---|---|---|---|
| Admixture | Copolymer A | Copolymer B | None | Conventional Polycarboxylate | Conventional Polycarboxylate |
| Dose (% wt cmt) | 0.16 | 0.16 | — | 0.1 | 0.1 |
| Defoamer | TBP | TBP | None | TBP | TBP |
| Dose (% wt cmt) | 0.004 | 0.004 | — | 0.004 | 0.004 |
| Cement (lbs/yd3) | 644 | 644 | 645 | 648 | 645 |
| Sand (lbs/yd3) | 1310 | 1310 | 1312 | 1318 | 1311 |
| Stone 1 (lbs/yd3) | 1863 | 1863 | 1866 | 1874 | 1865 |
| Water (lbs/yd3) | 271 | 271 | 272 | 273 | 271 |
| Water/Cement | 0.42 | 0.42 | 0.42 | 0.42 | 0.42 |
| Sand/Aggregate | 0.43 | 0.43 | 0.43 | 0.43 | 0.43 |
| Slump (in) | | | | | |
| 5 Min | 4.50 | 5.00 | 4.00 | 9.25 | 8.75 |
| 30 Min | 8.50 | 7.75 | 3.50 | 9.75 | 8.25 |
| 55 Min | 8.25 | 8.00 | 3.25 | 8.25 | 8.25 |
| 80 Min | 8.25 | 7.00 | 2.50 | 7.50 | 7.50 |
| Slump Diameter (in) | | | | | |
| 5 Min | — | — | — | 22.00 | 13.50 |
| 30 Min | 13.25 | 11.25 | — | 23.00 | 13.25 |
| 55 Min | 14.00 | 12.25 | — | 14.00 | 13.25 |
| 80 Min | 13.25 | 9.75 | — | 10.75 | — |
| Air Content (%) | | | | | |
| 5 Min | 2.5 | 2.5 | 2.3 | 1.9 | 2.4 |
| 80 Min | 2.4 | 2.7 | 2.3 | 2.4 | 2.4 |
| Initial Gravimetric Air Content (%) | 2.5 | 2.5 | 2.4 | 2.1 | 2.1 |

Examples 6 and 7 and Comparative Example 8

Sample cementitious compositions were prepared by first introducing the admixture and defoamer into the mix water in the amounts listed in Table 2 below. The stone, cement, and sand were added in the amounts shown in Table 2, and the mixture was mixed for five minutes at 20 rpm in a drum mixer. The slump of a sample of this mixture was tested (test duration approximately two minutes), and mixing resumed within five minutes, at four rpm. Mixing cycles of 20 minutes followed by test cycles of five minutes were repeated to generate the data shown in Table 2. The composition of Example 6 included Copolymer B, having Component A hydroxyethylacrylate residues and Component C polyethylene glycol vinyl ether residues, that of Example 7 included Copolymer A having Component A hydroxyethylacrylate residues and Component B polyethylene glycol vinyl ether residues, and that of Comparative Example 8 included a conventional polycarboxylate dispersant.

Figure 3:
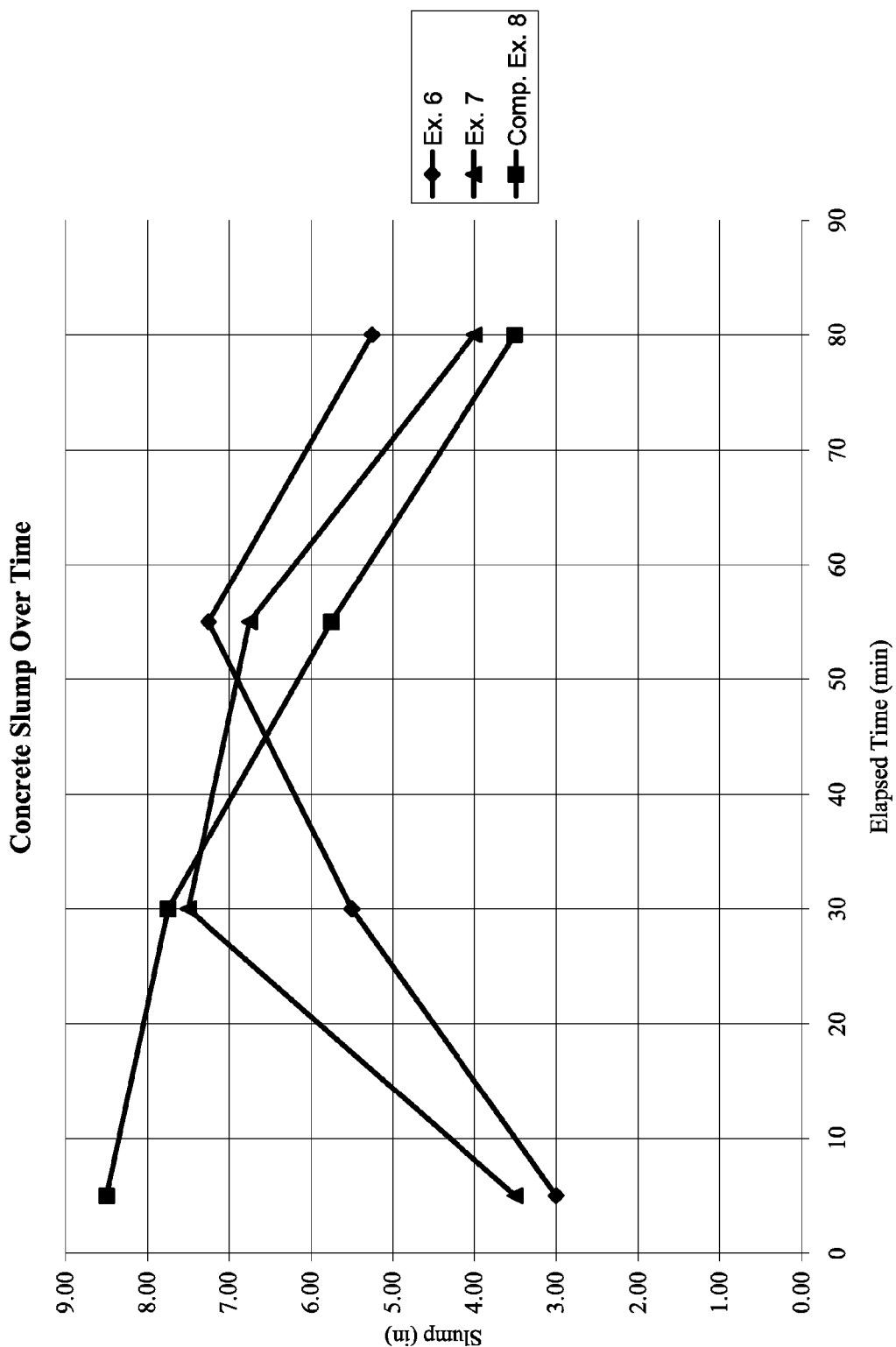
FIG. 3 is a graphical representation of concrete slump versus time achieved by the use of a subject copolymer as compared to conventional polycarboxylate dispersants and no slump-affecting admixture.

The workability of each cementitious composition, as represented by its slump, was determined according to ASTM C143, reported in Table 2, below. The air content, set time (ASTM C403), and compressive strength (ASTM C39) of each composition were also determined and reported in Table 2. As shown in Table 2 and FIG. 3, Copolymers A and B used in Examples 6 and 7 produced opposite workability performance characteristics over time as compared to the polycarboxylate dispersant utilized in Comparative Example 8, while not sacrificing air content, set time, or compressive strength. The conventional polycarboxylate dispersant produced maximum concrete workability quickly, which was lost over time. In contrast, Copolymers A and B produced low initial workability and maximum workability after 55 minutes. Initial slump was not affected by the addition of the non-ionic copolymers, but use of the non-ionic copolymers as compared to the polycarboxylate dispersant improved slump retention, as the slump exhibited by the polycarboxylate dispersant containing mixture was initially high but steadily decreased.

TABLE 2

| | Ex. 6 | Ex. 7 | Comp. Ex. 8 |
|---|---|---|---|
| Admixture | Copolymer B | Copolymer A | Conventional Polycarboxylate |
| Dose (% wt cmt) | 0.1 | 0.1 | 0.1 |
| Defoamer | TBP | TBP | TBP |
| Dose (% wt cmt) | 0.003 | 0.003 | 0.003 |
| Cement (lbs/yd3) | 565 | 565 | 566 |
| Sand (lbs/yd3) | 1356 | 1356 | 1359 |
| Stone 1 (lbs/yd3) | 1309 | 1309 | 1312 |
| Stone 2 (lbs/yd3) | 562 | 562 | 563 |
| Water (lbs/yd3) | 280 | 280 | 281 |
| Water/Cement | 0.50 | 0.50 | 0.50 |
| Sand/Aggregate | 0.44 | 0.44 | 0.44 |
| Slump (in) | | | |
| 5 Min | 3.00 | 3.50 | 8.50 |
| 30 Min | 5.50 | 7.50 | 7.75 |
| 55 Min | 7.25 | 6.75 | 5.75 |
| 80 Min | 5.25 | 4.00 | 3.50 |
| Air Content (%) | | | |
| 5 Min | 1.9 | 1.9 | 1.7 |
| 80 Min | 1.8 | 1.9 | 1.8 |
| Initial Gravimetric Air Content (%) | 2.0 | 1.9 | 0.8 |
| Initial Set (hrs) | 4.2 | 4.1 | 4.1 |
| Final Set | 5.8 | 5.6 | 5.6 |
| Compressive Strengths (psi) | | | |
| 1 Day | 2020 | 2000 | 2120 |
| 6 Day | 4850 | 4760 | 4880 |
| 28 Day | 6280 | 6180 | 6240 |

Synthesis Example Copolymer C

A glass reactor vessel equipped with multiple necks, a mechanical stirrer, pH-meter and dosing equipment (e.g. syringe pump) was charged with 100 g of water and 60.67 g of molten vinyl-PEG 1100 (solution A). The temperature in the reactor was adjusted to 13° C. and the pH was adjusted to approximately 7 by addition of 0.28 g of 25% sulfuric acid solution.

A second solution (solution B), consisting of 152.11 g water and 52.82 g of hydroxyethyl acrylate (HEA, 98.5%) was prepared. To solution B was added 1.74 g 3-mercaptopropionic acid (3-MPA). A third solution, (solution C) containing 1.5 g of sodium hydroxymethane sulfinate dihydrate in 48.5 g water was prepared. The polymerization was initiated by adding 21 mg $FeSO_4 \times 7H_2O$ that was dissolved in several milliliters of water and 1.34 g of $H_2O_2$ (30%) solution to the reaction vessel. Simultaneously, the dosing of solution B and C into the polymerization vessel was started. Solution B was dosed over a period of 30 minutes using varying addition rates as described in the table below. Solution C was dosed at a constant speed of 1.54 g/h over a period of 30 minutes followed by a higher dosing speed of 50 g/h over an additional 10 minutes. During the 30 minute dosing period of solution B, the pH in the reactor was maintained at 5.9 by adding 20% aqueous NaOH solution. The pH of the polymer solution after the addition of solution C was 5.9 and climbed to 6.8 upon destruction of remaining amounts of $H_2O_2$. An aqueous solution of a polyether-polyester copolymer with a yield of 92.5%, a weight-average molecular weight of 28300 g/mole, a PDI of 1.68 as determined by SEC and a solid content of 28.3% was obtained.

reactor was adjusted to 13° C. and the pH was adjusted to approximately 7 by addition of 3.4 g of 25% sulfuric acid solution.

A portion (19.88 g) of a previously prepared second solution, (solution B), consisting of 75.78 g water and 26.68 g of hydroxyethyl acrylate (HEA, 98.5%) was added to the reactor vessel drop wise over a period of 10 minutes while stirring moderately. A pH of 6.5 was measured for the resulting solution in the reactor. To the remaining solution B was added 2.7 g 3-mercaptopropionic acid (3-MPA). A further amount of 0.9 g 3-MPA was added to the reactor shortly before initiation of polymerization. A third solution, (solution C) containing 1.5 g of sodium hydroxymethane sulfinate dihydrate in 48.5 g water was prepared. The polymerization was initiated by adding 11 mg $FeSO_4 \times 7H_2O$ in several milliliters of water and 2.0 g of $H_2O_2$ (30%) solution to the reaction vessel. Simultaneously, the dosing of solution B and C was started into the polymerization vessel. Solution B was dosed over a period of 22 minutes. Solution C was dosed at a constant speed of 1.5 g/h over a period of 22 min followed by a higher dosing speed of 50 g/h over an additional 22 minutes using varying addition rates as described in the table below. During the 30 minute dosing period of solution B, the pH in the reactor was maintained at 6.4 by adding 20% aqueous NaOH solution. A pH of 6.4 was measured for the polymer solution after the addition of solution C was complete. An aqueous solution of a polyether-polyester copolymer with a yield of 86.2%, a weight-average molecular weight of 37,500 g/mole, a PDI of 1.3 as determined by SEC and a solids content of 45.2% was obtained.

Ramp Table C

| t (min) | 0 | 2 | 4 | 8 | 10 | 12 | 14 | 16 | 18 | 22 | 26 | 30 |
|---|---|---|---|---|---|---|---|---|---|---|---|---|
| g/h | 606 | 673 | 702 | 673 | 606 | 495 | 407 | 325 | 251 | 155 | 96 | 0 |

Synthesis Example Copolymer D

A glass reactor equipped with multiple necks, stirrer, pH meter and reflux-condenser was charged with 410 g water and 350 g of molten vinyl-PEG 3000. The temperature in the reactor was adjusted to 13° C. 0.5 g of a 2% $FeSO_4 \times 7H_2O$ solution and 124 g of hydroxyethylacrylate (HEA, 98%) were added, followed by addition of 3.4 g 3-Mercaptopropionic acid (3-MPA) and 4 g of ascorbic acid. The resulting pH was 5.5. After 2 min of mixing 1.2 g of $H_2O_2$ (50%) were added. Shortly thereafter a temperature rise was observed, peaking at 45° C. at 3 min while pH dropped to 4.7. After additional 5 min the pH of the solution is adjusted to pH=6.5 with 7 g of NaOH (20%). An aqueous solution of a polyether-polyester copolymer with a yield of 92.5%, a weight-average molecular weight of 28300 g/mole, a PDI of 1.68 as determined by SEC and a solid content of 53% was obtained.

Synthesis Example Copolymer E

A glass reactor vessel equipped with multiple necks, a mechanical stirrer, pH-meter and dosing equipment (e.g. syringe pump) was charged with 320 g water and 320 g of molten vinyl-PEG 5800 (solution A). The temperature in the Ramp Table E

| t (min) | 0 | 2 | 4 | 8 | 10 | 12 | 14 | 16 | 18 | 22 |
|---|---|---|---|---|---|---|---|---|---|---|
| g/h | 270 | 313 | 342 | 313 | 261 | 218 | 173 | 124 | 85 | 0 |

Synthesis Example Copolymer F

A glass reactor equipped with multiple necks, stirrer, pH meter and reflux-condenser was charged with 500 g water and 350 g of molten vinyl-PEG 5800. The temperature in the reactor was adjusted to 13° C. 0.5 g of a 2% $FeSO_4 \times 7H_2O$ solution and 85.7 g of hydroxyethylacrylate (HEA, 98%) were added, followed by addition of 2.2 g 3-Mercaptopropionic acid (3-MPA) and 2 g of ascorbic acid. The resulting pH was 5.5. After 2 min of mixing 0.6 g of $H_2O_2$ (50%) were added. Shortly thereafter a T-rise is observed, peaking at 32° C. at 3 min while pH dropped to 5.1. After additional 5 min the pH of the solution is adjusted to pH=6.5 with 5 g of NaOH (20%). An aqueous solution of a polyether-polyester copolymer with a yield of 92.5%, a weight-average weight of 52500 g/mole, a PDI of 1.52 as determined by SEC and a solid content of 45.8% was obtained.

Examples 8-13 and Comparative Example 14

Sample cementitious compositions were prepared by first combining water and polymer in the amounts listed in Table 3, below. The water solution was sampled and tested to determine the initial concentration of polymer. Cement was added to each test solution in the amount listed in Table 3, and the mixtures were then mixed at 700 rpm to form a paste. A small portion of the paste was then removed, pressure filtered to isolate the liquid phase present in the paste, and the concentration of polymer in the filtrate solution was determined. The original paste sample was returned to the mixer and the process was repeated to provide the data reported in Table 3 below. As shown in Table 3, the composition of Example 8 included Copolymer A described above, that of Example 9 included Copolymer C having Component A hydroxyethylacrylate residues and Component B polyethylene glycol vinyl ether residues in a ratio of 8:1, that of Example 10 included Copolymer B also described above, that of Example 11 included Copolymer D having Component A hydroxyethylacrylate residues and Component C polyethylene glycol vinyl ether residues in a ratio of 9:1, that of Example 12 included Copolymer E having Component A hydroxyethylacrylate residues and Component C polyethylene glycol vinyl ether residues in a ratio of 4:1, that of Example 13 included Copolymer F having Component A hydroxyethylacrylate residues and Component C polyethylene glycol vinyl ether residues in a ratio of 12:1, and that of Comparative Example 14 included a conventional polycarboxylate dispersant.

Figure 4:
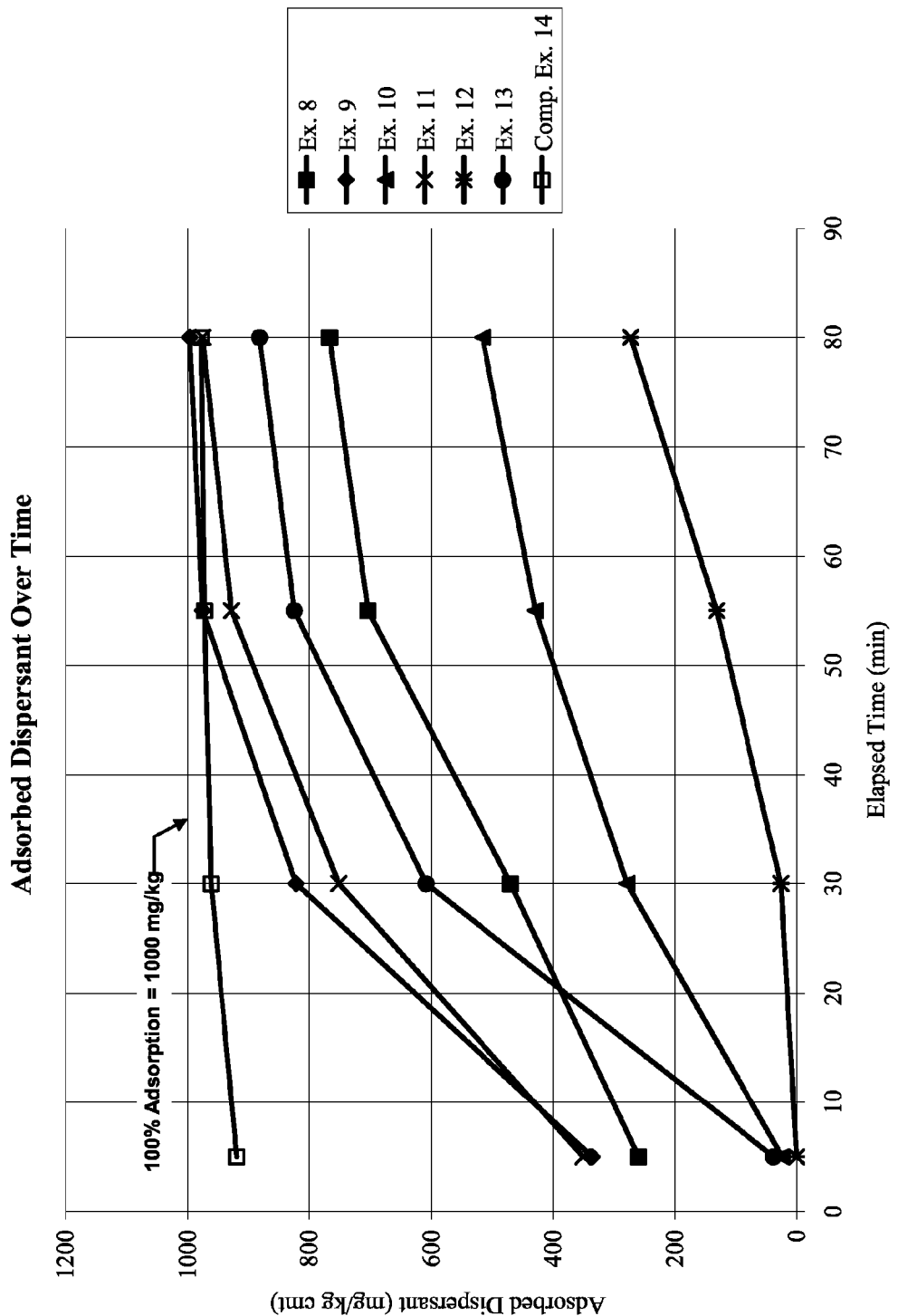
FIG. 4 is a graphical representation of the adsorption of various embodiments of the subject copolymer onto cement particles versus time as compared to a conventional polycarboxylate dispersant.

As shown in Table 3 and FIG. 4, the copolymers described herein are adsorbed onto the cement particles more slowly than the conventional polycarboxylate dispersant, providing low initial affinity and dispersing effect, but increasing both upon hydrolysis of Component A to remain active for a longer period of time, and thus extending the workability of the cementitious compositions to which they are added.

and tested to determine the hydrolysis percentage of the subject copolymers, as reported in Table 4. The copolymer Example 15 included hydroxyethylacrylate as the hydrolysable Component A residue as described herein, while that of Example 16 included hydroxypropylacrylate as the hydrolysable Component A residue as described herein. Both copolymers contained non-hydrolysable Component B residues.

Figure 5:
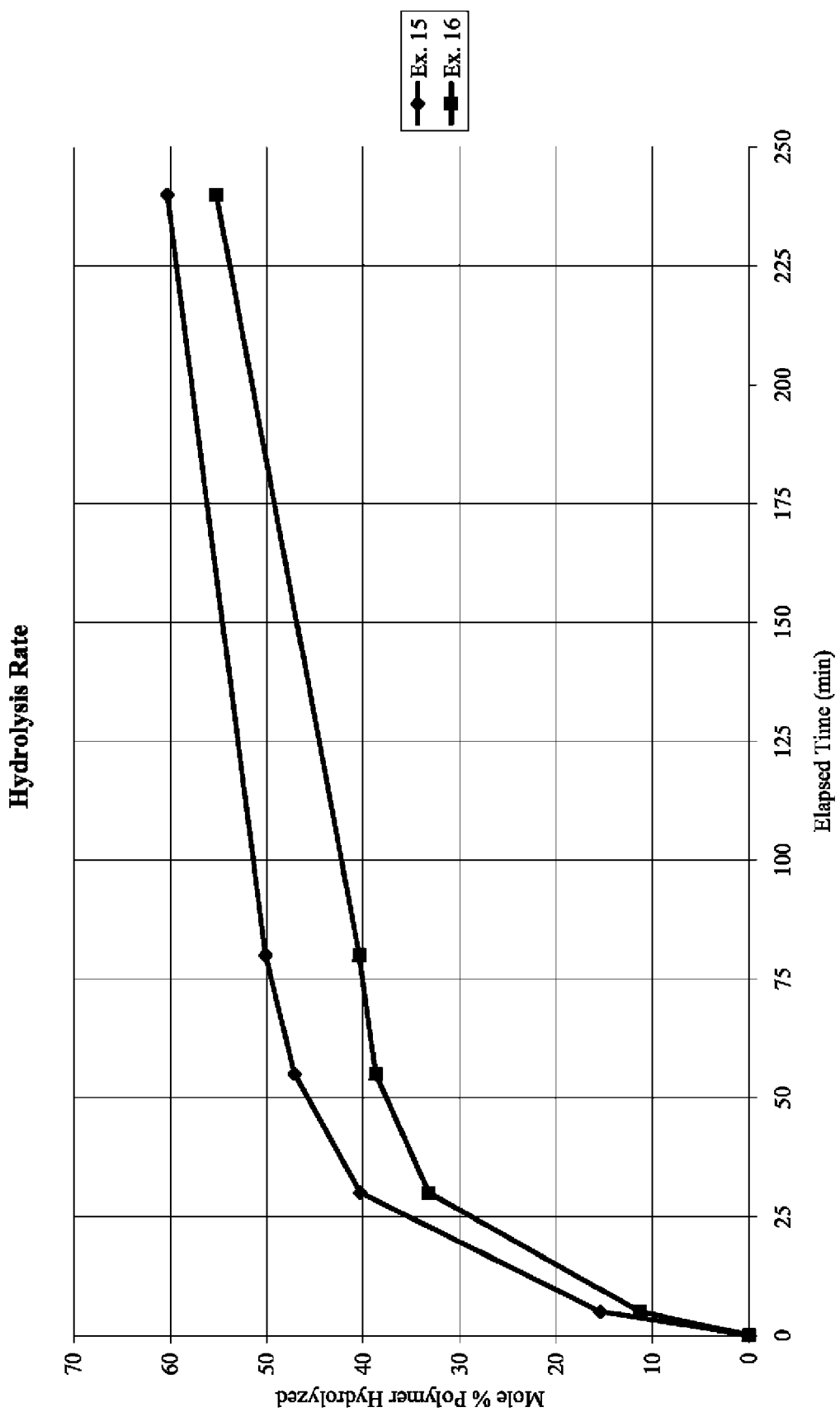
FIG. 5 is a graphical representation of hydrolyzation of subject copolymers versus time comparing two embodiments of the subject copolymer.

As shown in Table 4 and FIG. 5, the hydrolysis rates of the two copolymers differ. This data demonstrates that hydrolysis rates can be controlled by using different hydrolysable components in various embodiments of subject copolymers, and further by mixing different embodiments of the subject copolymers. By controlling the hydrolysis rate, the workability of the cementitious compositions to which the copolymers are added can be controlled with precision.

TABLE 4

| Elapsed Time (min) | Ex. 15 % Hydrolysis | Ex. 16 % Hydrolysis |
|---|---|---|
| 0 | 0 | 0 |
| 5 | 15.4 | 11.3 |
| 30 | 40.3 | 33.2 |
| 55 | 47.1 | 38.7 |
| 80 | 50.1 | 40.4 |
| 240 | 60.3 | 55.2 |

Examples 17, 18 and 19 and Comparative Example 20

Sample cementitious compositions were prepared by first introducing the admixture and defoamer into the mix water in the amounts listed in Table 5 below. The stone, cement, fly ash, and sand were added in the amounts shown in Table 5, and the mixture was mixed for five minutes at 20 rpm in a drum mixer. The slump of a sample of this mixture was tested (test duration approximately two minutes), and mixing resumed within five minutes, at four rpm. Mixing cycles of 20

TABLE 3

| | Ex. 8 | Ex. 9 | Ex. 10 | Ex. 11 | Ex. 12 | Ex. 13 | Comp. Ex. 14 |
|---|---|---|---|---|---|---|---|
| Admixture | Copolymer A | Copolymer C | Copolymer B | Copolymer D | Copolymer E | Copolymer F | Conventional Polycarboxylate |
| Dose (% cmt) | 0.1% | 0.1% | 0.1% | 0.1% | 0.1% | 0.1% | 0.10% |
| Cement (g) | 1000 | 1000 | 1000 | 1000 | 1000 | 1000 | 1000 |
| Water (g) | 400 | 400 | 400 | 400 | 400 | 400 | 400 |
| Water/Cement | 0.40 | 0.40 | 0.40 | 0.40 | 0.40 | 0.40 | 0.40 |
| Polymer Adsorption (%) | | | | | | | |
| 5 Min | 26.0 | 33.6 | 2.4 | 35.0 | −3.9 | 3.8 | 92.0 |
| 30 Min | 47.0 | 82.3 | 27.9 | 75.1 | 2.6 | 61.0 | 96.3 |
| 55 Min | 70.4 | 97.7 | 42.9 | 92.6 | 13.2 | 82.6 | 97.4 |
| 80 Min | 76.7 | 99.8 | 51.7 | 97.4 | 27.3 | 88.3 | 97.9 |
| Polymer Adsorbed (mg/kg cmt) | | | | | | | |
| 5 Min | 260 | 336 | 24 | 351 | 0 | 38 | 919 |
| 30 Min | 470 | 822 | 279 | 752 | 26 | 609 | 962 |
| 55 Min | 704 | 976 | 429 | 928 | 132 | 825 | 973 |
| 80 Min | 767 | 997 | 516 | 976 | 273 | 882 | 978 |

Examples 15 and 16

Hydrolysis rates of the subject copolymers at room temperature were tested by first combining sodium hydroxide and water, then adding the subject copolymer. Samples of the mixtures were extracted at the times listed in Table 4, below, minutes followed by test cycles of five minutes were repeated to generate the data shown in Table 5. The compositions of Examples 17 through 19 included differing ratios of a combination of Copolymer B and a traditional lignosulfonate water reducing dispersant, while that of Comparative Example 20 included only the lignosulfonate dispersant.

Figure 6:
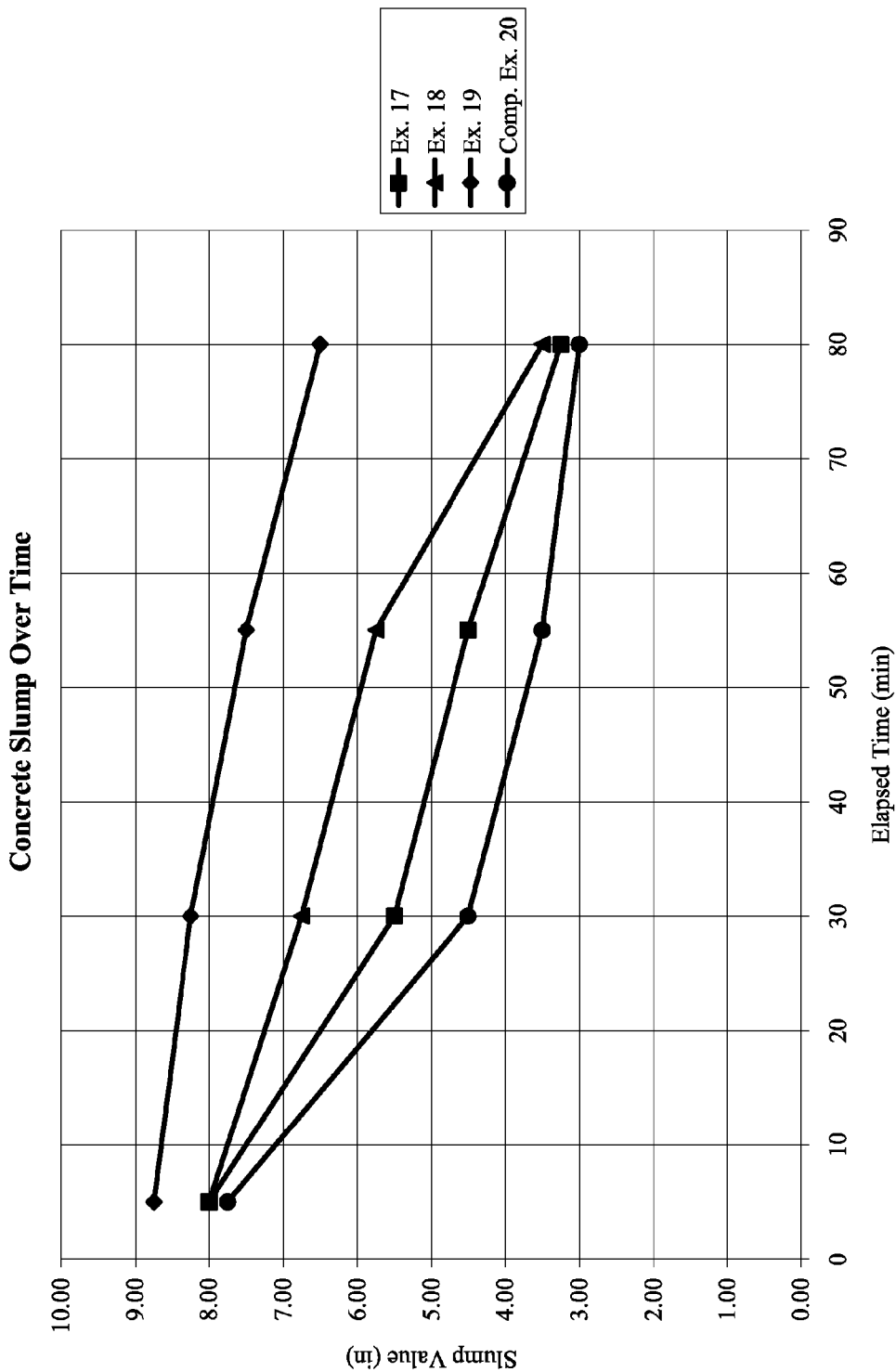
FIG. 6 is a graphical representation of concrete slump versus time achieved by the use of various dosages of one embodiment of a subject copolymer in combination with a conventional water reducing dispersant as compared to a conventional water reducing dispersant.

The workability of each cementitious composition, as represented by its slump, was determined according to ASTM C143, reported in Table 5, below. The air content, set time (ASTM C403), and compressive strength (ASTM C39) of each composition were also determined and are reported in Table 5. As shown in Table 5 and FIG. 6, a combination of Copolymers B and a lignosulfonate dispersant, as used in Examples 17 through 19, maintain the workability of the cementitious compositions longer than the lignosulfonate dispersant utilized in Comparative Example 20, while not sacrificing air content, set time, or compressive strength. Further, as shown by the increased workability of Example 19 compared with Examples 17 and 18, an increased amount of Copolymer B performed better than lesser amounts of Copolymer B to increase slump retention.

TABLE 5

|  | Ex. 17 | Ex. 18 | Ex. 19 | Comp. Ex. 20 |
| --- | --- | --- | --- | --- |
| Dose (% cmt + FA) | 0.004 | 0.004 | 0.004 | 0.004 |
| Defoamer | TBP | TBP | TBP | TBP |
| Dose (% cmt + FA) | 0.025 | 0.05 | 0.1 | — |
| Admixture | Copolymer B | Copolymer B | Copolymer B | — |
| Dose (% cmt + FA) | 0.25 | 0.25 | 0.25 | 0.25 |
| Admixture | Lignosulfonate | Lignosulfonate | Lignosulfonate | Lignosulfonate |
| Cement (lbs/yd3) | 474 | 473 | 474 | 474 |
| Fly Ash (FA) (lbs/yd3) | 109 | 109 | 109 | 109 |
| Sand (lbs/yd3) | 1397 | 1394 | 1395 | 1397 |
| Stone 1 (lbs/yd3) | 1825 | 1821 | 1823 | 1825 |
| Water (lbs/yd3) | 277 | 276 | 277 | 277 |
| Water/Cement | 0.47 | 0.47 | 0.47 | 0.47 |
| Sand/Aggregate | 0.45 | 0.45 | 0.45 | 0.45 |
| Slump (in) | | | | |
| 5 Min | 8.00 | 8.00 | 8.75 | 7.75 |
| 30 Min | 5.50 | 6.75 | 8.25 | 4.50 |
| 55 Min | 4.50 | 5.75 | 7.50 | 3.50 |
| 80 Min | 3.25 | 3.50 | 6.50 | 3.00 |
| Air Content (%) | | | | |
| 5 Min | 1.8 | 2.0 | 1.9 | 1.8 |
| 80 Min | 1.6 | 1.7 | 1.7 | 1.5 |
| Gravimetric Air (%) | | | | |
| Initial | 1.5 | 1.6 | 1.6 | 1.5 |
| Initial Set (hrs) | 6.5 | 6.8 | 7.6 | 6.2 |
| Final Set (hrs) | 8.2 | 8.4 | 9.1 | 7.9 |
| Compressive Strengths (psi) | | | | |
| 1 Day | 1710 | 1680 | 1540 | 1630 |
| 7 Day | 4260 | 4180 | 4340 | 4410 |
| 28 Day | 6060 | 5910 | 6050 | 6160 |

Synthesis Example Copolymer G

A glass reactor vessel equipped with multiple necks, a mechanical stirrer, pH-meter and dosing equipment (e.g. syringe pump) was charged with 55 g water and 99.3 g of molten vinyl-PEG 500 (solution A). The temperature in the reactor was adjusted to 13° C. and the pH was adjusted to approximately 7 by addition of 0.3 g of 25% sulfuric acid solution.

A portion (89.45 g) of a previously prepared second solution, (solution B) consisting of 272.8 g water and 96.06 g of hydroxyethyl acrylate (HEA, 98.5%) was added to the reactor vessel drop wise over a period of 10 minutes while stirring moderately. A pH of 6.4 was measured for the resulting solution in the reactor. To the remaining solution B was added 1.65 g 3-mercaptopropionic acid (3-MPA). A further amount of 0.89 g 3-MPA was added to the reactor shortly before initiation of polymerization. A third solution, (solution C) containing 1.5 g of sodium hydroxymethane sulfinate dihydrate in 48.5 g water was prepared. The polymerization was initiated by adding 19 mg $FeSO_4 \times 7H_2O$ in several milliliters of water and 1.23 g of $H_2O_2$ (30%) solution to the reaction vessel. Simultaneously, the dosing of solution B and C was started into the polymerization vessel. Solution B was dosed over a period of 30 minutes using varying addition rates as described in the table below. Solution C was dosed at a constant speed of 4.5 g/h over a period of 30 min followed by a higher dosing speed of 100 g/h over an additional 11 minutes. During the 30 minute dosing period of solution B, the pH in the reactor was maintained at 6.4 by adding 20% aqueous NaOH solution. A pH of 6.7 was measured for the polymer solution after the addition of solution C was complete. An aqueous solution of a polyether-polyester copolymer with a yield of 97.4%, a weight-average molecular weight of 42,100 g/mole, a PDI of 2.31 as determined by SEC and a solids content of 35.2% was obtained.

| Ramp Table G | | | | | | | | | | | |
|---|---|---|---|---|---|---|---|---|---|---|---|
| t (min) | | | | | | | | | | | |
| 0 | 2 | 4 | 8 | 10 | 12 | 14 | 16 | 18 | 22 | 26 | 30 |
| g/h 816 | 906 | 945 | 906 | 816 | 667 | 548 | 438 | 338 | 209 | 129 | 0 |

Examples 21, 22 and 23, and Comparative Example 24

Sample cementitious compositions suitable for use in precast applications were prepared by mixing the stone, cement, sand and water, in the amounts listed in Table 6, below, for five minutes at 20 rpm. After the first minute of mixing, the naphthalene sulfonate admixture was added in the amount shown in Table 6. The initial slump and air content were then determined during the initial portion of the five minute test period, as reported in table 6. The second slump affecting admixture, if present, was then added to the composition in the amounts shown in Table 6, and mixing was resumed for 20 minutes at four rpm. The slump was again determined, as reported in Table 6. This process was then repeated to compile the data reported in Table 6. The composition of Example 21 included Copolymer B discussed above, that of Example 22 included Copolymer A discussed above, that of Example 23 included Copolymer G having Component A hydroxyethylacrylate residues and Component B polyethylene glycol vinyl ether residues in a molar ratio of 4:1, and that of Comparative Example 24 did not include a slump affecting admixture.

Figure 7:
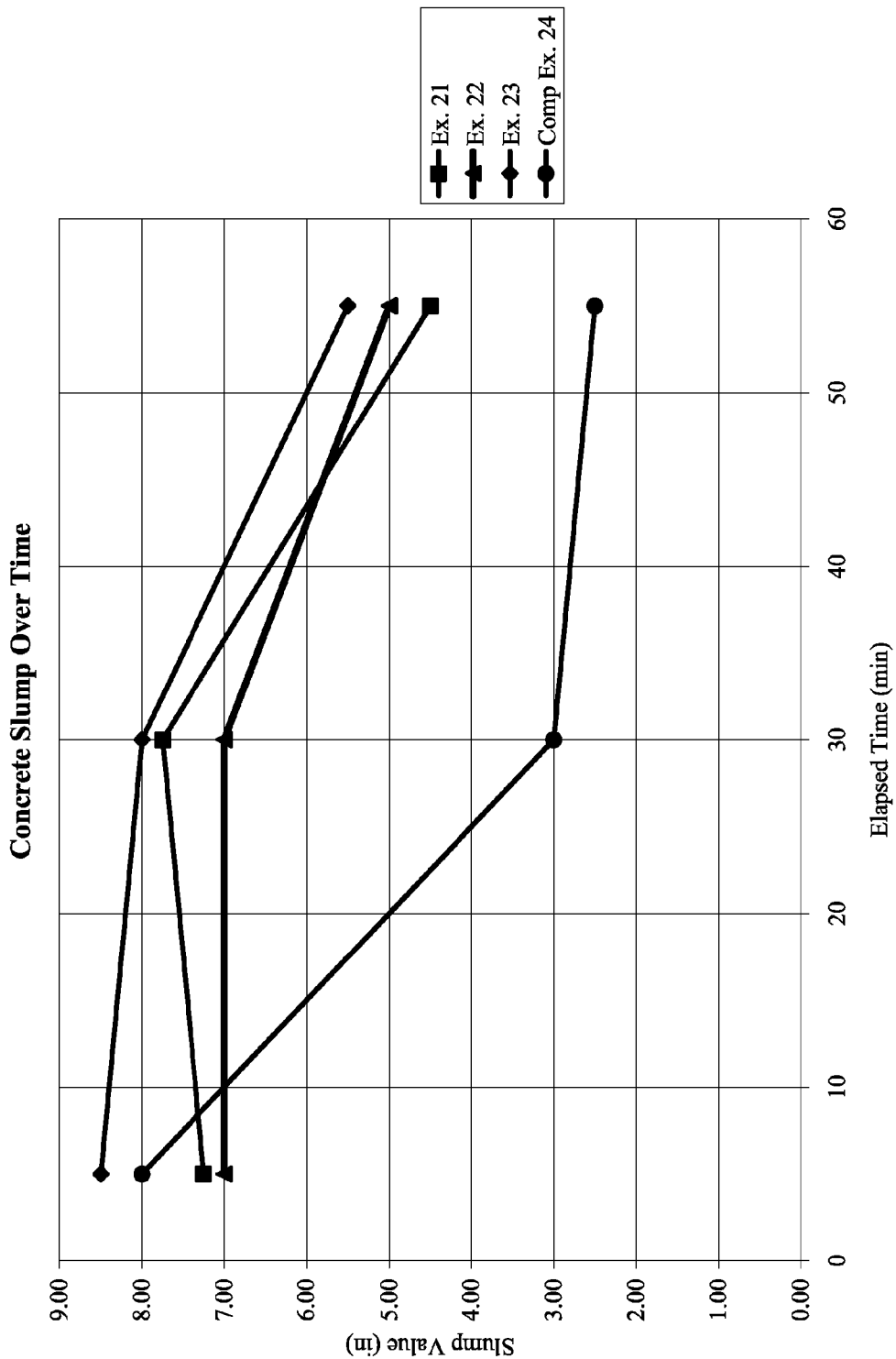
FIG. 7 is a graphical representation of concrete slump versus time achieved by the use of various embodiments of the subject copolymer in combination with a conventional naphthalene sulfonate dispersant as compared to a conventional naphthalene sulfonate dispersant.

The workability of each cementitious composition, as represented by its slump, was determined according to ASTM C143, reported in Table 6, below. The air content, set time (ASTM C403), and compressive strength (ASTM C39) of each composition were also determined, reported in Table 6. As shown in Table 6 and FIG. 7, the subject non-ionic copolymers, when used in combination with a traditional water reducing naphthalene sulfonate admixture, extended the workability of the cementitious composition much more effectively than naphthalene sulfonate alone. Due to slight incompatibility between naphthalene sulfonates and the non-ionic copolymers, the addition of the copolymers was delayed until the traditional water reducer had been mixed in the cementitious composition for about 10 minutes.

TABLE 6

|  | Ex. 21 | Ex. 22 | Ex. 23 | Comp. Ex. 24 |
|---|---|---|---|---|
| Dose (% cmt) | 0.004 | 0.004 | 0.004 | 0.004 |
| Defoamer | TBP | TBP | TBP | TBP |
| Dose (% cmt) | 0.20 | 0.20 | 0.20 | — |
| Admixture | Polymer B | Copolymer A | Copolymer G | — |
| Dose (% cmt) | 0.55 | 0.55 | 0.55 | 0.55 |
| Admixture | Naphthalene Sulfonate | Naphthalene Sulfonate | Naphthalene Sulfonate | Naphthalene Sulfonate |
| Cement (lbs/yd3) | 672 | 672 | 672 | 656 |
| Sand (lbs/yd3) | 1294 | 1293 | 1294 | 1262 |
| Stone 1 (lbs/yd3) | 1910 | 1908 | 1910 | 1863 |
| Water (lbs/yd3) | 247 | 247 | 247 | 275 |
| Water/Cement | 0.37 | 0.37 | 0.37 | 0.42 |
| Sand/Aggregate | 0.42 | 0.42 | 0.42 | 0.42 |
| Slump (in) | | | | |
| 5 Min | 7.25 | 7.00 | 8.50 | 8.00 |
| 30 Min | 7.75 | 7.00 | 8.00 | 3.00 |
| 55 Min | 4.50 | 5.00 | 5.50 | 2.50 |
| Total Slump Loss | 2.75 | 2.00 | 3.00 | 5.50 |
| Air Content (%) | | | | |
| 5 Min | 2.6 | 2.7 | 2.6 | 3.0 |
| 80 Min | 2.4 | 2.4 | 2.6 | 2.4 |
| Gravametric Air (%) | | | | |
| Initial | 1.9 | 1.9 | 2.1 | 1.7 |
| Initial Set (hrs) | 5.7 | 5.9 | 6.6 | 4.9 |
| Final Set (hrs) | 7.0 | 7.3 | 7.9 | 6.0 |
| Compressive Strengths (psi) | | | | |
| 1 Day | 2800 | 2970 | 2630 | 2870 |
| 7 Day | 6230 | 6300 | 5690 | 6240 |
| 28 Day | 7770 | 7910 | 7670 | 7710 |

Synthesis Example Copolymer H

A glass reactor vessel equipped with multiple necks, a mechanical stirrer, pH-meter and dosing equipment (e.g. syringe pump) was charged with 267 g water and 330.9 g of molten vinyl-PEG 3000 (solution A). The temperature in the reactor was adjusted to 13° C. and the pH was adjusted to approximately 7 by addition of 2.5 g of 25% sulfuric acid solution.

A portion (44.95 g) of a previously prepared second solution, (solution B) consisting of 169.86 g water and 59.81 g of hydroxypropyl acrylate (HPA, 96%) was added to the reactor vessel drop wise over a period of 10 minutes while stirring moderately. A pH of 6.5 was measured for the resulting solution in the reactor. To the remaining solution B was added 2.28 g 3-mercaptopropionic acid (3-MPA). A further amount of 0.76 g 3-MPA was added to the reactor shortly before initiation of polymerization. A third solution, (solution C) containing 1.5 g of sodium hydroxymethane sulfinate dihydrate in 48.5 g water was prepared. The polymerization was initiated by adding 21 mg $FeSO_4 \times 7H_2O$ in several milliliters of water and 1.34 g of $H_2O_2$ (30%) solution to the reaction vessel. Simultaneously, the dosing of solution B and C was started into the polymerization vessel. Solution B was dosed over a period of 30 minutes using varying addition rates as described in the table below. Solution C was dosed at a constant speed of 1.5 g/h over a period of 30 min followed by a higher dosing speed of 50 g/h over an additional 10 minutes. During the 30 minute dosing period of solution B, the pH in the reactor was maintained at 6.5 by adding 20% aqueous NaOH solution. A pH of 6.5 was measured for the polymer solution after the addition of solution C was complete. An aqueous solution of a polyether-polyester copolymer with a yield of 93.3%, a weight-average molecular weight of 51,500 g/mole, a PDI of 1.67 as determined by SEC and a solids content of 46.1% was obtained.

| Ramp Table H | | | | | | | | | | | |
|---|---|---|---|---|---|---|---|---|---|---|---|
| t (min) | | | | | | | | | | | |
| 0 | 2 | 4 | 8 | 10 | 12 | 14 | 16 | 18 | 22 | 26 | 30 |
| g/h 545 | 605 | 631 | 605 | 545 | 445 | 366 | 292 | 226 | 140 | 86 | 0 |

Synthesis Example Copolymer J

A glass reactor vessel equipped with multiple necks, a mechanical stirrer, pH-meter and dosing equipment (e.g. syringe pump) was charged with 138 g water and 182 g of molten vinyl-PEG 1100 (solution A). The temperature in the reactor was adjusted to 13° C. and the pH was adjusted to approximately 7 by addition of 3.75 g of 25% sulfuric acid solution.

A portion (67.42 g) of a previously prepared second solution, (solution B) consisting of 254.79 g water and 89.72 g of hydroxypropyl acrylate (HPA, 96%) was added to the reactor vessel drop wise over a period of 10 minutes while stirring moderately. A pH of 6.5 was measured for the resulting solution in the reactor. To the remaining solution B was added 2.46 g 3-mercaptopropionic acid (3-MPA). A further amount of 0.82 g 3-MPA was added to the reactor shortly before initiation of polymerization. A third solution, (solution C) containing 1.5 g of sodium hydroxymethane sulfinate dihydrate in 48.5 g water was prepared. The polymerization was initiated by adding 31 mg $FeSO_4 \times 7H_2O$ in several milliliters of water and 2.01 g of $H_2O_2$ (30%) solution to the reaction vessel. Simultaneously, the dosing of solution B and C was started into the polymerization vessel. Solution B was dosed over a period of 90 minutes using varying addition rates as described in the table below. Solution C was dosed at a constant speed of 4.0 g/h over a period of 90 min followed by a higher dosing speed of 40 g/h over an additional 37 minutes. During the 90 minute dosing period of solution B, the pH in the reactor was maintained at 6.5 by adding 20% aqueous NaOH solution. A pH of 6.6 was measured for the polymer solution after the addition of solution C was complete. An aqueous solution of a polyether-polyester copolymer with a yield of 94.7%, a weight-average molecular weight of 32,700 g/mole, a PDI of 2.13 as determined by SEC and a solids content of 38.6% was obtained.

| Ramp Table J | | | | | | | | | | | |
|---|---|---|---|---|---|---|---|---|---|---|---|
| t (min) | | | | | | | | | | | |
| 0 | 9 | 18 | 27 | 36 | 45 | 54 | 63 | 72 | 81 | 90 | |
| g/h 246 | 280 | 295 | 280 | 244 | 185 | 127 | 85 | 59 | 49 | 0 | |

Examples 25-28 and Comparative Example 29

Sample cementitious compositions were prepared by first introducing the admixtures and defoamer into the mix water in the amounts listed in Table 7 below. The stone, cement and sand were added in the amounts shown in Table 7, and the mixture was mixed for five minutes at 20 rpm in a drum mixer. The slump of a sample of this mixture was tested (test duration approximately two minutes), and mixing resumed within five minutes, at four rpm. Mixing cycles of 20 minutes followed by test cycles of five minutes were repeated to generate the data shown in Table 7. All of the sample cementitious compositions included a conventional polycarboxylate ether dispersant in the amounts shown in Table 7. The sample cementitious compositions of Examples 25 through 28 also included the following non-ionic copolymers, respectively: Copolymer B described above, Copolymer H having Component A hydroxypropylacrylate residues and Component C polyethylene glycol vinyl ether residues in a molar ratio of 4:1, Copolymer A described above, and Copolymer J having Component A hydroxypropylacrylate residues and Component B polyethylene glycol vinyl ether residues in a molar ratio of 4:1.

Figure 8:
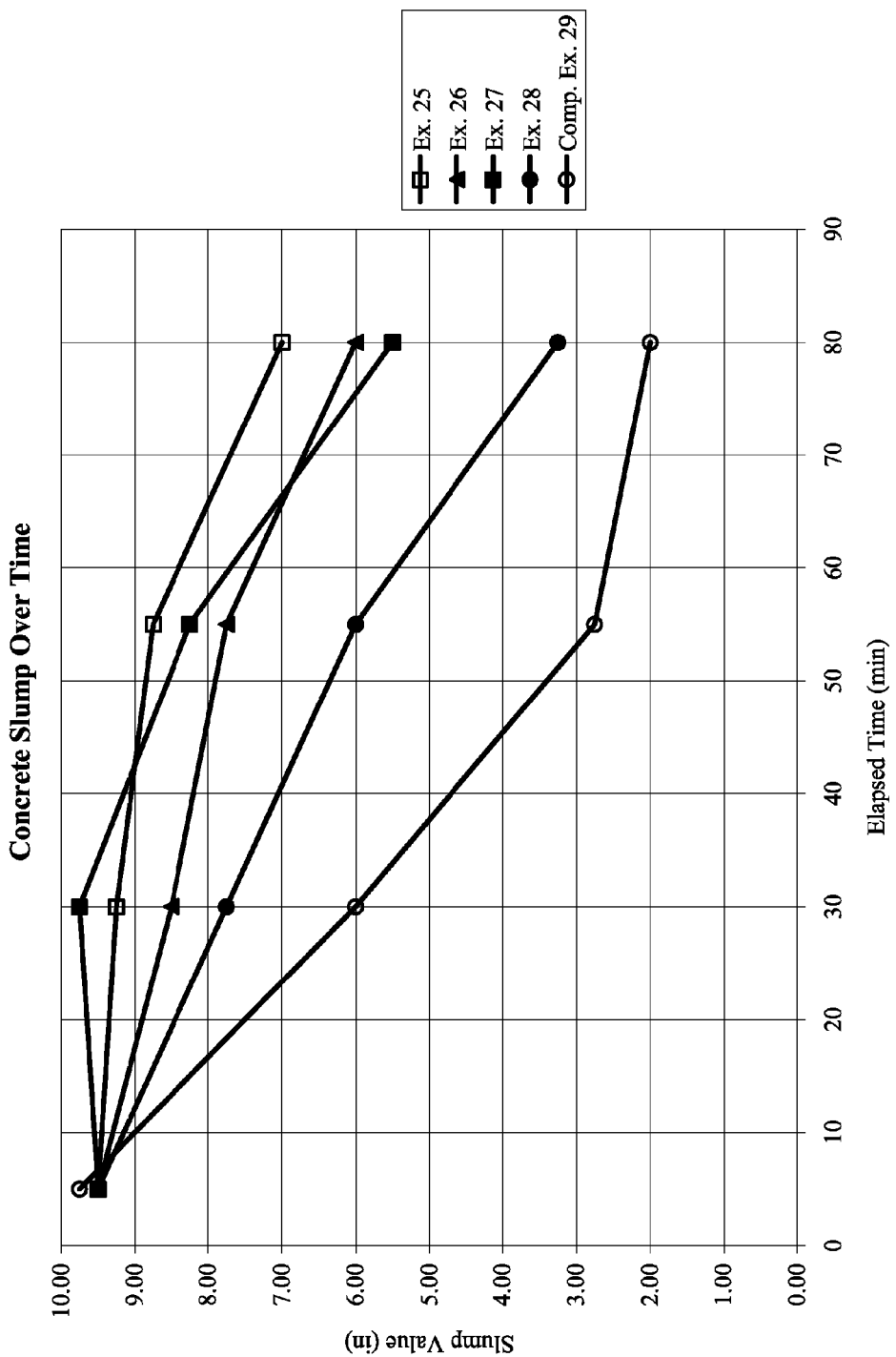
FIG. 8 is a graphical representation of concrete slump versus time achieved by the use of various embodiments of a subject copolymer in combination with a conventional polycarboxylate dispersant versus a conventional polycarboxylate dispersant.

The workability of each cementitious composition, as represented by its slump, was determined according to ASTM C143, reported in Table 7, below. The air content, set time (ASTM C403), and compressive strength (ASTM C39) of each composition were also determined, reported in Table 7. As shown in Table 7 and FIG. 8, the subject copolymers as described herein, when combined with conventional polycarboxylate ether dispersants, extend the workability of the composition much more effectively than the conventional polycarboxylate ether dispersant alone, regardless of whether the hydroxyethylacrylate or hydroxypropylacrylate moiety was present (although apparently hydrolyzing at differing rates), while increasing the compressive strength of the final product and not significantly changing set time and air content.

TABLE 7

|  | Ex. 25 | Ex. 26 | Ex. 27 | Ex. 28 | Comp. Ex. 29 |
| --- | --- | --- | --- | --- | --- |
| Dose (% cmt) | 0.004 | 0.004 | 0.004 | 0.004 | 0.004 |
| Defoamer | TBP | TBP | TBP | TBP | TBP |
| Dose (% cmt) | 0.1 | 0.1 | 0.1 | 0.1 | 0.115 |
| Admixture | PCE | PCE | PCE | PCE | PCE |
| Dose (% cmt) | 0.1 | 0.1 | 0.1 | 0.1 | |
| Admixture | Copolymer B | Copolymer H | Copolymer A | Copolymer J | |
| Cement (lbs/yd3) | 567 | 547 | 567 | 547 | 561 |
| Sand (lbs/yd3) | 1430 | 1379 | 1431 | 1381 | 1415 |
| Stone 1 (lbs/yd3) | 1847 | 1782 | 1849 | 1784 | 1829 |
| Water (lbs/yd3) | 271 | 262 | 272 | 262 | 269 |
| Water/Cement | 0.48 | 0.48 | 0.48 | 0.48 | 0.48 |
| Sand/Aggregate | 0.45 | 0.45 | 0.45 | 0.45 | 0.45 |
| Slump (in) | | | | | |
| 5 Min | 9.50 | 9.50 | 9.50 | 9.50 | 9.75 |
| 30 Min | 9.25 | 8.50 | 9.75 | 7.75 | 6.00 |
| 55 Min | 8.75 | 7.75 | 8.25 | 6.00 | 2.75 |
| 80 Min | 7.00 | 6.00 | 5.50 | 3.25 | 2.00 |
| Total Slump Loss | 2.50 | 3.50 | 4.00 | 6.25 | 7.75 |
| Air Content (%) | | | | | |
| 5 Min | 1.5 | 5.0 | 1.4 | 4.9 | 2.5 |
| 80 Min | 2.2 | 2.5 | 1.8 | 2.1 | 2.3 |
| Gravametric Air (%) | | | | | |
| Initial | 2.7 | 5.6 | 1.4 | 5.3 | 2.7 |
| Initial Set (hrs) | 4.8 | 4.6 | 4.8 | 4.7 | 4.3 |
| Final Set (hrs) | 6.1 | 5.9 | 6.0 | 5.8 | 5.7 |
| Compressive Strengths (psi) | | | | | |
| 1 Day | 2730 | 2740 | 2860 | 2680 | 2510 |
| 7 Day | 5440 | 5630 | 5850 | 5570 | 5310 |
| 28 Day | 6780 | 6780 | 7060 | 6830 | 6480 |

Examples 30 and 31 and Comparative Example 32

Sample cementitious compositions suitable for use in precast applications were prepared by first introducing the admixtures and defoamer into the mix water in the amounts listed in Table 8 below. The stone, cement and sand were added in the amounts shown in Table 8, and the mixture was mixed for five minutes at 20 rpm in a drum mixer. The slump of a sample of this mixture was tested (test duration approximately two minutes), and mixing resumed within five minutes, at four rpm. Mixing cycles of 20 minutes followed by test cycles of five minutes were repeated to generate the data shown in Table 5. Examples 30 and 31 included differing ratios of a combination of Copolymer B described above, and a conventional polycarboxylate ether dispersant, while Comparative Example 32 included only a conventional polycarboxylate ether dispersant.

Figure 9:
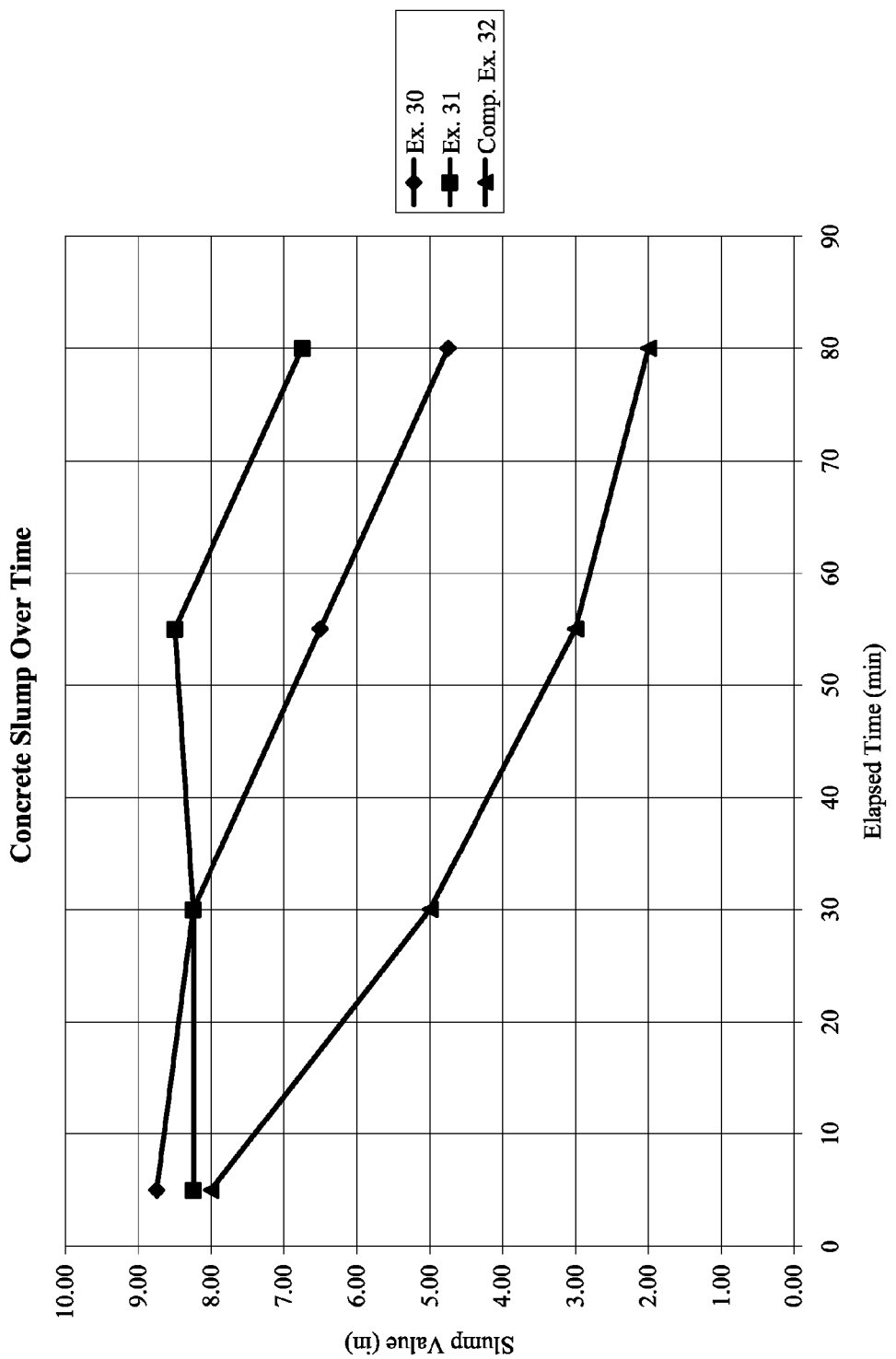
FIG. 9 is a graphical representation of concrete slump versus time achieved by the use of various dosages of one embodiment of a subject copolymer in combination with a conventional polycarboxylate dispersant versus a conventional polycarboxylate dispersant.

The workability of each cementitious composition, as represented by its slump, was determined according to ASTM C143, reported in Table 8, below. The air content, set time (ASTM C403), and compressive strength (ASTM C39) of each composition were also determined and are reported in Table 8. As shown in Table 8 and FIG. 9, a combination of Copolymer B and a conventional polycarboxylate ether dispersant, as used in Examples 30 and 31, maintain the workability of the cementitious compositions longer than the polycarboxylate ether (PCE) utilized in Comparative Example 20, while not sacrificing air content or set time, and increasing the compressive strength. Further, as shown by the increased workability of Example 31 compared with Example 30, an increased amount of Copolymer B performed better than a lesser amount of Copolymer B.

TABLE 8

|  | Ex. 30 | Ex. 31 | Comp. Ex. 32 |
| --- | --- | --- | --- |
| Dose (% cmt) | 0.003 | 0.003 | 0.003 |
| Defoamer | TBP | TBP | TBP |
| Dose (% cmt) | 0.054 | 0.080 | — |
| Admixture | Copolymer B | Copolymer B | — |
| Dose (% cmt) | 0.106 | 0.106 | 0.106 |
| Admixture | PCE | PCE | PCE |
| Cement (lbs/yd3) | 601 | 601 | 600 |
| Sand (lbs/yd3) | 1370 | 1370 | 1367 |
| Stone 1 (lbs/yd3) | 1877 | 1877 | 1874 |
| Water (lbs/yd3) | 271 | 271 | 270 |
| Water/Cement | 0.45 | 0.45 | 0.45 |
| Sand/Aggregate | 0.44 | 0.44 | 0.44 |
| Slump (in) | | | |
| 5 Min | 8.75 | 8.25 | 8.00 |
| 30 Min | 8.25 | 8.25 | 5.00 |
| 55 Min | 6.50 | 8.50 | 3.00 |
| 80 Min | 4.75 | 6.75 | 2.00 |
| Air Content (%) | | | |
| 5 Min | 1.8 | 1.8 | 2.0 |
| 80 Min | 2.1 | 2.2 | 2.1 |
| Initial Set (hrs) | 4.2 | 4.4 | 4.3 |
| Final Set (hrs) | 5.5 | 5.7 | 5.6 |
| Compressive Strengths (psi) | | | |
| 1 Day | 2950 | 3160 | 2640 |
| 7 Day | 5770 | 6400 | 5350 |
| 28 Day | 7230 | 7890 | 6520 |

Examples 33, 34 and 35, and Comparative Example 36

Three additional copolymers were prepared having a ratio of hydroxyethylacrylate residues to polyethylene glycol vinyl ether residues of 4:1. Copolymer K and Copolymer L had a molar ratio of Component B polyethylene glycol vinyl ether residues (molecular weight 1100) to Component C polyethylene glycol vinyl ether residues (molecular weight 3000) of 0.5/0.5. Copolymer M had a molar ratio of Component B polyethylene glycol vinyl ether residues (molecular weight 1100) to Component C polyethylene glycol vinyl ether residues (molecular weight 3000) of 0.7/0.3.

Sample cementitious compositions were prepared by introducing the admixtures and defoamer into the mix water in the amounts listed in Table 9 below. The stone, cement and sand were added in the amounts shown in Table 9, and the mixture was mixed for five minutes at 20 rpm in a drum mixer. The slump of a sample of this mixture was tested (test duration approximately two minutes), and mixing resumed within five minutes, at four rpm. Mixing cycles of 20 minutes followed by test cycles of five minutes were repeated to generate the data shown in Table 9. All of the sample cementitious compositions included a conventional polycarboxylate ether dispersant in the amounts shown in Table 9. The sample cementitious compositions of Examples 33 through 35 also included the following copolymers, respectively: Copolymer K, Copolymer L and Copolymer M, as described above.

Figure 10:
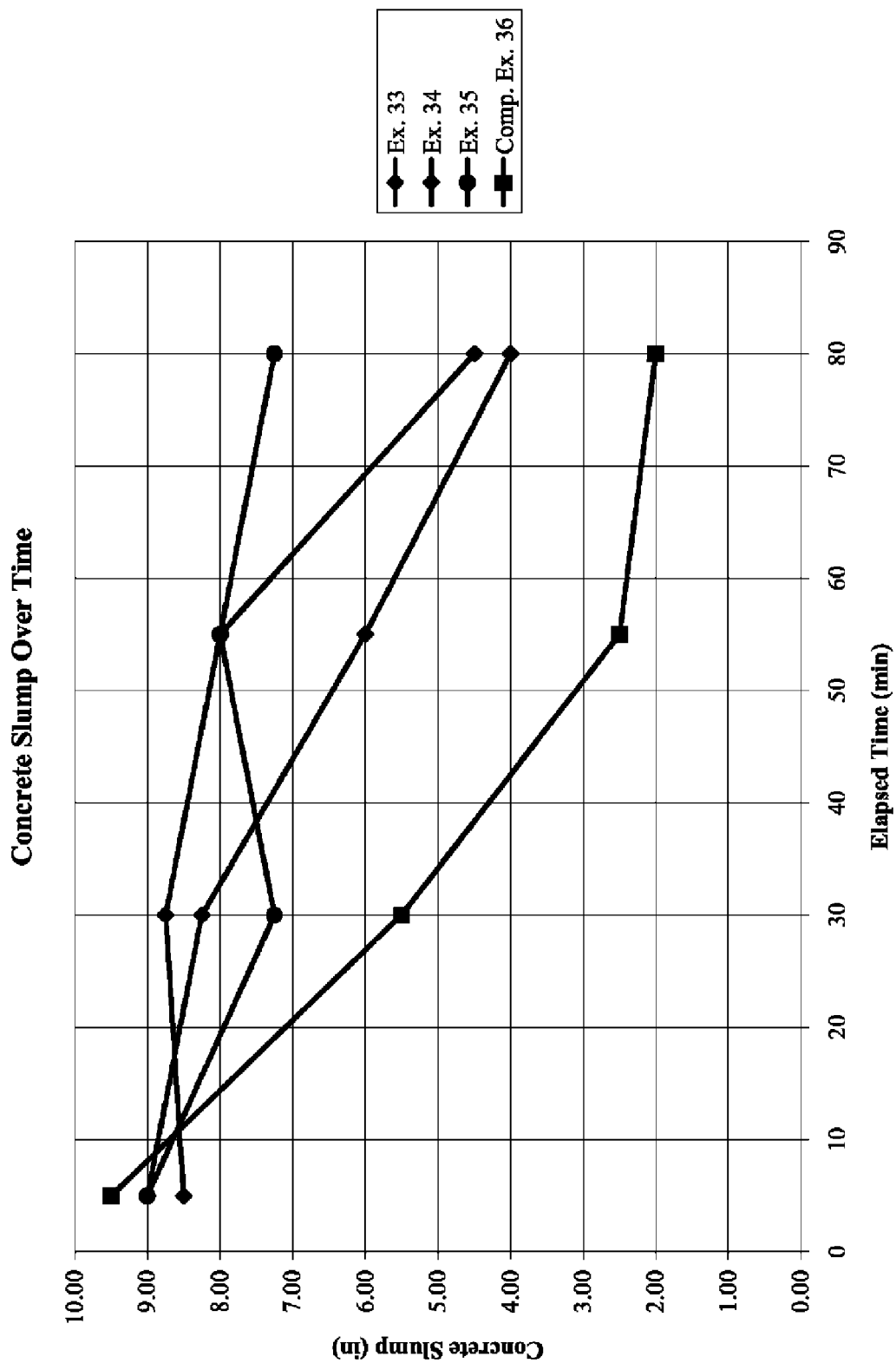
FIG. 10 is a graphical representation of concrete slump versus time achieved by the use of various embodiments of subject copolymers comprising both Component B and Component C in combination with a conventional polycarboxylate dispersant versus a conventional polycarboxylate dispersant.

The workability of each cementitious composition, as represented by its slump, was determined according to ASTM C143, reported in Table 9, below. The air content, set time (ASTM C403), and compressive strength (ASTM C39) of each composition were also determined, reported in Table 9. As shown in Table 9 and FIG. 10, the subject copolymers as described herein, when combined with conventional polycarboxylate ether dispersants, extend the workability of the composition much more effectively than the conventional polycarboxylate ether dispersant alone, while increasing the compressive strength of the final product and not significantly changing set time and air content.

TABLE 9

|  | Ex. 33 | Ex. 34 | Ex. 35 | Comp. Ex. 36 |
| --- | --- | --- | --- | --- |
| Dose (% cmt) | 0.004 | 0.004 | 0.004 | 0.004 |
| Defoamer | TBP | TBP | TBP | TBP |
| Dose (% cmt) | 0.10 | 0.10 | 0.10 | — |
| Admixture | Copolymer K | Copolymer L | Copolymer M | — |
| Dose (% cmt) | 0.10 | 0.10 | 0.10 | 0.12 |
| Admixture | PCE | PCE | PCE | PCE |
| Cement (lbs/yd3) | 570 | 570 | 568 | 568 |
| Sand (lbs/yd3) | 1433 | 1433 | 1428 | 1428 |
| Stone 1 (lbs/yd3) | 1868 | 1868 | 1862 | 1862 |
| Water (lbs/yd3) | 258 | 258 | 258 | 258 |
| Water/Cement | 0.45 | 0.45 | 0.45 | 0.45 |
| Sand/Aggregate | 0.45 | 0.45 | 0.45 | 0.45 |
| Slump (in) | | | | |
| 5 Min | 8.50 | 9.00 | 9.00 | 9.50 |
| 30 Min | 8.75 | 8.25 | 7.25 | 5.50 |
| 55 Min | 8.00 | 6.00 | 8.00 | 2.50 |
| 80 Min | 4.50 | 4.00 | 7.25 | 2.00 |
| Air Content (%) | | | | |
| 5 Min | 1.8 | 1.8 | 2.1 | 2.1 |
| 80 Min | 2.1 | 2.4 | 1.8 | 2.3 |
| Initial Set (hrs) | 4.3 | 4.6 | 4.7 | 4.4 |
| Final Set (hrs) | 5.5 | 5.8 | 6.0 | 5.8 |
| Compressive Strengths (psi) | | | | |
| 1 Day | 3380 | 3440 | 3330 | 2830 |
| 7 Day | 6360 | 6350 | 6430 | 5640 |
| 28 Day | 7880 | 8000 | 7750 | 6930 |

The subject non-ionic copolymer, although having no initial affinity for cement particles, in combination with cementitious compositions exhibits superior workability retention, minimizes the need for slump adjustment during production and at the jobsite, minimizes mixture over-design requirements, reduces re-dosing of high-range water-reducers at the jobsite, and provides high flowability and increased stability and durability. The subject copolymer admixture system is suitable for extending workability of cementitious compositions adapted for ready mix, highly-filled, precast, and other applications, such as oil well grouts.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A process for the preparation of a non-ionic copolymer comprising at least one hydrolysable monomer residue and at least one polyether macromonomer residue in a semicontinuous mode of operation in a polymerization apparatus containing a polymerization reactor associated with a metering device, the process comprising:

introducing at least a portion of the polyether macromonomer with low reactivity and water into the polymerization reactor, wherein the hydrolysable monomer with higher reactivity which is added thereto forms an aqueous medium polymerization reaction mixture, optionally wherein the aqueous medium is present in the form of an aqueous solution;

introducing at least a portion of the hydrolysable monomer into the metering device:

adding at least a portion of the hydrolysable monomer into the polymerization reactor, optionally before passing a free radical polymerization initiator into the polymerization reactor;

passing the free radical polymerization initiator into the polymerization reactor, wherein the hydrolysable monomer and the polyether macromonomer are reacted in the aqueous medium polymerization reaction mixture by free radical polymerization with formation of the non-ionic copolymer; and, subjecting the reaction mixture to polymerization while an addition rate of the hydrolysable monomer from the metering device is decreased stepwise or continuously at least after a first reaction period;

wherein no monomer is introduced into the polymerization reactor to incorporate ionic cement binding sites into the non-ionic copolymer prior to mixing the copolymer in an alkaline aqueous environment.

2. The process of claim 1, wherein at least 70 mol % of the polyether macromonomer initially introduced into the polymerization reactor is converted by the free radical polymerization.

3. The process of claim 1, wherein the hydrolysable monomer is at least one ethylenically unsaturated hydrolysable monomer of Component A and the polyether macromonomer is at least one ethylenically unsaturated polyoxyalkylene ether-based monomer of Component B and/or Component C.

4. The process of claim 3, wherein the polymerization reaction mixture contains a portion of the monomer of Component B and/or Component C together with at least a portion of Component A before polymerization is commenced.

5. The process of claim 3, comprising initially adding the ethylenically unsaturated monomer of Component B and/or Component C in advance into the reactor in their whole amount before the addition into the reactor of any of the ethylenically unsaturated monomer of Component A.

6. The process of claim 3, further comprising introducing into the polymerization reactor at least one further unsaturated monomer of Component D.

7. The process of claim 1, wherein a redox initiator system is used as the free radical polymerization initiator.

8. The process of claim 7, wherein the redox initiator system is the combination $H_2O_2/FeSO_4$ together with a reducing agent.

9. The process of claim 8, wherein the reducing agent comprises disodium salt of 2-hydroxy-2-sulphinatoacetic acid, the disodium salt of 2-hydroxy-2-sulphonatoacetic acid, sodium hydroxymethanesulphinate, ascorbic acid, isoascorbic acid, or mixtures thereof.

10. The process of claim 7, wherein a component of the redox initiator system/reducing agent, and optionally a chain transfer agent, are passed into the polymerization reactor after a polymerization has been established.

11. The process of claim 7, wherein a component of the redox initiator system/reducing agent, and optionally a chain transfer agent, are passed into the polymerization reactor after a polymerization pH has been established, and while the hydrolysable monomer is metered in.

12. The process of claim 1, wherein 80 mol % to at least 90 mol %, of the polyether macromonomer initially introduced into the polymerization reactor is converted by the free radical polymerization.

13. The process of claim 1, wherein a polymerization pH is established at about 4.5 to about 7.1, and the temperature of the aqueous medium during the free radical polymerization is 0 to about 90° C., optionally about 10 to about 35° C.

14. The process of claim 1, wherein the hydrolysable monomer is initially introduced together with water into the metering device and an aqueous solution of the hydrolysable monomer is added from the metering device into the polymerization reactor.

15. The process of claim 1, wherein a chain regulator, which is optionally in dissolved form, is passed into the polymerization reactor.

16. The process of claim 1, wherein the polyether macromonomer is initially introduced into the polymerization reactor in an amount per mole of hydrolysable monomer added and/or metered in such that an arithmetic mean molar ratio of hydrolysable monomer residues to polyether macromonomer residues of about 10:1 to about 1:1 is established in the non-ionic copolymer formed.

17. The process of claim 1, wherein the polyether macromonomer is initially introduced into the polymerization reactor in an amount per mole of hydrolysable monomer added and/or metered in such that an arithmetic mean molar ratio of hydrolysable monomer residues to polyether macromonomer residues of about 9:1 to about 1:1 is established in the non-ionic copolymer formed.

18. The process of claim 1, including passing a chain transfer agent into the polymerization reactor before and/or during the addition of the hydrolysable monomer into the polymerization reactor.

19. The process of claim 1, wherein the polymerization reactor is present as a semicontinuously stirred tank.

20. The process of claim 1, wherein the free radical polymerization initiator is passed into the polymerization reactor before and/or during the addition of the hydrolysable monomer into the polymerization reactor.

* * * * *